US010618834B2

(12) United States Patent
Habeck et al.

(10) Patent No.: US 10,618,834 B2
(45) Date of Patent: Apr. 14, 2020

(54) METHOD AND APPARATUS FOR PRODUCING A THIN GLASS RIBBON, AND THIN GLASS RIBBON PRODUCED ACCORDING TO SUCH METHOD

(71) Applicant: SCHOTT AG, Mainz (DE)

(72) Inventors: Andreas Habeck, Undenheim (DE); Thomas Rossmeier, Bodenheim (DE); Jürgen Vogt, Oberheimbach (DE); Ulrich Lange, Mainz (DE); Stephan Zachmann, Gau-Odernheim (DE); Thomas Wiegel, Alfeld (DE)

(73) Assignee: SCHOTT AG, Mainz (DE)

( * ) Notice: Subject to any disclaimer, the term of this patent is extended or adjusted under 35 U.S.C. 154(b) by 288 days.

(21) Appl. No.: 15/351,054

(22) Filed: Nov. 14, 2016

(65) Prior Publication Data

US 2017/0057860 A1 Mar. 2, 2017

Related U.S. Application Data

(63) Continuation of application No. PCT/EP2015/058104, filed on Apr. 14, 2015.

(30) Foreign Application Priority Data

May 14, 2014 (DE) .................. 10 2014 106 817

(51) Int. Cl.
*C03B 29/16* (2006.01)
*C03B 21/06* (2006.01)
(Continued)

(52) U.S. Cl.
CPC ............ *C03B 29/16* (2013.01); *C03B 17/064* (2013.01); *C03B 21/02* (2013.01); *C03B 21/06* (2013.01)

(58) Field of Classification Search
CPC .......... C03C 3/078; C03C 3/083; C03C 3/089
See application file for complete search history.

(56) References Cited

U.S. PATENT DOCUMENTS

| | | | |
|---|---|---|---|
| 4,828,900 | A | 5/1989 | Mouly |
| 5,609,284 | A | 3/1997 | Kondratenko |
| | | (Continued) | |

FOREIGN PATENT DOCUMENTS

| | | |
|---|---|---|
| DE | 281404 | 2/1914 |
| DE | 473234 | 3/1929 |
| | (Continued) | |

OTHER PUBLICATIONS

English translation of International Preliminary Report on Patentability dated Nov. 24, 2016 for corresponding PCT/EP2015/058104, 12 pages.

(Continued)

*Primary Examiner* — Gerard Higgins
(74) *Attorney, Agent, or Firm* — Ohlandt, Greeley, Ruggiero & Perle, L.L.P.

(57) ABSTRACT

An improved method and an improved apparatus are provided for producing a thin glass ribbon, which provide borders at the edges of the ribbon. The edges formed are of high mechanical quality and a formation of new secondary borders after the severing or at least the thickness of such secondary borders is reduced compared to the original borders. The method includes drawing the thin glass ribbon from a molten glass or from a preform, severing the borders, and cooling the resulting glass ribbon. The severing is effected at a location along the moving direction of the thin glass ribbon and at a time at which during the cooling of the thin glass ribbon the viscosity of the glass is in a range from (Continued)

$10^7$ dPa·s to $10^{11}$ dPa·s, so that the edges of the thin glass ribbon newly produced by the severing of the borders are rounded off.

16 Claims, 18 Drawing Sheets

(51) Int. Cl.
  *C03B 21/02* (2006.01)
  *C03B 17/06* (2006.01)

(56) References Cited

U.S. PATENT DOCUMENTS

| | | | |
|---|---|---|---|
| 5,631,195 A * | 5/1997 | Yanagisawa | C03C 3/078 501/69 |
| 5,902,368 A | 5/1999 | Witzmann et al. | |
| 6,112,967 A | 9/2000 | Ostendarp et al. | |
| 6,268,304 B1 * | 7/2001 | Maeda | C03C 3/091 501/63 |
| 6,329,310 B1 * | 12/2001 | Peuchert | C03C 3/091 501/64 |
| 6,407,360 B1 | 6/2002 | Choo et al. | |
| 2002/0001738 A1 | 1/2002 | Uhlik | |
| 2007/0140311 A1 * | 6/2007 | House | C03B 17/064 374/100 |
| 2008/0184741 A1 | 8/2008 | Mueller et al. | |
| 2009/0110963 A1 | 4/2009 | Nakashima | |
| 2012/0040211 A1 | 2/2012 | Murata | |
| 2012/0219792 A1 * | 8/2012 | Yamamoto | C03C 3/087 428/336 |
| 2013/0202715 A1 * | 8/2013 | Wang | C03C 3/095 424/618 |
| 2014/0216107 A1 | 8/2014 | Brunello | |
| 2015/0004390 A1 | 1/2015 | Kawamoto | |
| 2015/0251947 A1 * | 9/2015 | Lestrigant | C03C 3/085 345/174 |

FOREIGN PATENT DOCUMENTS

| | | | |
|---|---|---|---|
| DE | 1255872 | 12/1967 | |
| DE | 69304194 | 1/1997 | |
| DE | 19735357 | 2/1999 | |
| EP | 0717011 | 6/1996 | |
| EP | 0872303 | 6/2003 | |
| JP | H01203235 | 8/1989 | |
| JP | 2001080928 | 3/2001 | |
| JP | 2002534305 A * | 10/2002 | |
| JP | 2003519884 | 6/2003 | |
| JP | 2008195602 | 8/2008 | |
| JP | 2009280478 | 12/2009 | |
| JP | 2010215498 | 9/2010 | |
| JP | 2011144093 | 7/2011 | |
| JP | 2014073952 | 4/2014 | |
| JP | 2014508096 | 4/2014 | |
| WO | 02051757 | 7/2002 | |
| WO | 03051783 | 6/2003 | |
| WO | 2010051410 | 5/2010 | |
| WO | 2010099304 | 9/2010 | |
| WO | WO-2011069338 A1 * | 6/2011 | C03C 3/095 |
| WO | 2012158232 | 11/2012 | |
| WO | WO-2014044985 A1 * | 3/2014 | C03C 3/085 |
| WO | 2014052548 | 4/2014 | |

OTHER PUBLICATIONS

English translation of Written Opinion dated Jul. 7, 2015 for corresponding PCT/EP2015/058104, 9 pages.
English translation of International Search Report dated Jul. 7, 2015 for corresponding PCT/EP2015/058104, 3 pages.
Performance and Test Analysis of Silicate Industrial Products with English translation, 8 pages.
Thermal Equipment for Inorganic Nonmetallic Materials (4th Edition), Hangzhou Jiang, p. 478, Wuhan University of Technology Press, Dec. 2013.
English translation of Chinese Office Action dated May 30, 2019 in corresponding Chinese Application No. 201580025061, provided as a statement of relevance as to the Thermal Equipment for Inorganic Nonmetallic Materials Article at the last paragraph of p. 5 of the Chinese Office Action.

* cited by examiner

METHOD AND APPARATUS FOR PRODUCING A THIN GLASS RIBBON, AND THIN GLASS RIBBON PRODUCED ACCORDING TO SUCH METHOD

CROSS REFERENCE TO RELATED APPLICATIONS

This application is a continuation of International Application No. PCT/EP2015/058104 filed on Apr. 14, 2015, which claims the benefit under 35 U.S.C. 119 of German Application No. 10 2014 106 817.3 filed on May 14, 2014, the entire contents of both of which are incorporated by reference herein.

BACKGROUND

1. Field of the Invention

The invention relates to a method and an apparatus for producing a thin glass ribbon, and relates to a thin glass ribbon produced according to such method. The thin glass ribbon may even be a glass film.

2. Description of Related Art

Thin glass is increasingly employed for various applications, such as in the sectors of consumer electronics, for example as cover glasses for semiconductor modules, for organic LED light sources, or for thin or curved display devices, or in sectors of renewable energy or energy technology, such as in solar cells. Examples include touch panels, capacitors, thin film batteries, flexible circuit boards, flexible OLEDs, flexible photovoltaic modules, and even e-papers. Thin glass is getting more and more into the focus for many applications due to its excellent properties such as chemical resistance, thermal shock resistance, and heat resistance, gas tightness, its high electrical insulation capability, matched expansion coefficients, flexibility, high optical quality, and light transmission, as well as high surface quality with very low roughness in case of a fire-polished surface of the two thin glass faces.

Processes for producing a thin glass ribbon in which the thin glass ribbon is drawn from a molten glass in a thickness of less than or equal to 300 micrometers, usually cause thickenings, referred to as borders, that are formed at the two lateral edges across the moving or drawing direction of the thin glass ribbon that is being drawn, as compared to the thinner useful glass in the center of the thin glass ribbon. These borders usually have a thickness of about 350 µm to 400 µm.

In order to be capable to coil or bend a thin glass in form of a glass ribbon even to rather small diameters so as to save volume space and in particular with regard to a compact storage and cost-effective transportation to further processing locations, it is advantageous or necessary to separate these borders. Furthermore it is desirable to separate the borders since they may lead to stresses in the glass caused by uneven cooling of the entire glass ribbon, and may therefore be problematic. Hitherto, the severing of the borders has usually been effected in the cold post-processing section on the annealed molten glass. As a severing or cutting method for the thin glass, conventional technologies are employed, such as separating by scoring using wheels and subsequent breaking, as well as light-optical methods, such as by laser scribing and subsequent breaking.

For example, WO 2010/099304 A2 also discloses a method for separating a portion from a glass ribbon at a predetermined separation line. In this case, the glass ribbon is first shaped in a region along the separation line, at a viscosity of less than or equal to $7 \times 10^{14}$ poises (dPa·s), by causing the region to be at a temperature at or above the softening point, in particular by means of a laser, plasma, microwave, flame, or a focused infrared beam, and by transversely applying a load to the glass ribbon so as to form a constricted section having a thickness that is less than the thickness of the glass ribbon on each side of the region. Subsequently, the glass ribbon shaped in this way is cooled so as to have a viscosity of greater than $7 \times 10^{14}$ poises (dPa·s). Then, a tension is applied to the cooled glass ribbon so that the glass ribbon breaks along the constricted section and thus is separated along the predefined separation line.

However, due to the broken edges with associated roughness and microcracks, such separation processes may lead to an uncontrolled breakage of the glass.

Therefore, in order to prevent cracks and breakage from arising in particular in the coiled or bent glass ribbon, the quality and integrity of the edges is of particular importance.

Furthermore, a particular problem with the drawing of thin glasses is the fact that due to the considerably larger glass thickness the border cools much more slowly than the useful glass between the border regions. The slower cooling causes the glass in the border regions to become more compressed than in the center thereby creating stresses in the glass ribbon which may lead to warpage.

SUMMARY

Therefore, the invention is based on the object to provide an improved method and an improved apparatus which provide for severing glass borders so as to form glass edges of high mechanical quality, and so that a formation of new secondary borders after the severing from the ribbon-shaped molten glass is prevented or at least the thickness of such secondary borders is reduced compared to the original borders. Also, stresses in the glass which may result in unevenness or warp of the glass, should be avoided as far as possible after the severing. Thus, the thin glass ribbon produced according to the method should be of high quality and subsequent processing should be facilitated.

Accordingly, the invention provides a method for producing a thin glass ribbon, wherein the thin glass ribbon is drawn from a molten glass or from a preform in a thickness of not more than 300 µm (micrometers), preferably not more than 200 µm (micrometers), whereby borders are forming at the two edges of the thin glass ribbon, which borders have a greater thickness than the center of the thin glass ribbon, wherein the thin glass ribbon cools down after having been drawn, and wherein the borders are severed from the thin glass ribbon by means of a severing device, and wherein the severing is effected at a location along the moving direction of the thin glass ribbon and at a time at which during the cooling of the thin glass ribbon the glass has a viscosity in a range from $10^7$ dPa·s to $10^{11}$ dPa·s, and wherein the edges of the thin glass ribbon that are newly produced by severing the borders are rounding off.

After drawing, separating of the borders, and rounding off of the edge, the glass ribbon is annealed thereby minimizing stresses in the glass ribbon which may otherwise be caused due to different cooling rates of the useful glass and the thicker border.

In a preferred embodiment of the method, the severing of the borders during the cooling of the thin glass ribbon is effected at a viscosity of the glass in a range from $10^8$ dPa·s to $10^{11}$ dPa·s, more preferably in a range from $10^9$ dPa·s to $10^{10}$ dPa·s.

Advantageously, the method for producing a thin glass ribbon is performed using an apparatus which comprises a device for guiding the molten glass, preferably a drawing orifice, and a device for severing borders from the thin glass ribbon, which is arranged at a distance in a range from 80 mm (millimeters) to 400 mm, preferably from 150 mm to 400 mm, more preferably from 150 mm to 300 mm from the nearest melt contact surface of the device guiding the molten glass. If a glass ribbon is drawn from a preform, the same distances as mentioned may be applied to the hot forming section. In case of drawing from a preform the hot forming section is defined by a heating means for heating a preform. Therefore, according to one embodiment of the invention, the device for severing the borders from the thin glass ribbon is arranged so that the borders are severed at a distance ranging from 80 mm to 400 mm, preferably from 150 mm to 400 mm, more preferably ranging from 150 mm to 300 mm from the heating means for heating the preform.

The preferred range corresponds to glass temperatures from about 750° C. to 900° C., or to the glass viscosities mentioned above (from $10^{11}$ dPa·s to $10^7$ dPa·s).

Therefore, the apparatus according to the invention preferably includes setting means for adjusting at least one of parameters drawing rate, mass flow rate, and/or severing location in a manner so that the severing of the borders during the cooling of the thin glass ribbon is effected at a viscosity of the glass in a range from $10^7$ dPa·s to $10^{11}$ dPa·s, preferably in a range from $10^8$ dPa·s to $10^{11}$ dPa·s, more preferably in a range from $10^9$ dPa·s to $10^{10}$ dPa·s.

In order to obtain a particularly homogeneous temperature profile of the useful glass ribbon and thereby to prevent permanent mechanical stresses from arising in the glass, the severing of the borders is preferably effected with a width in a range from 30 mm to 150 mm, preferably in a range from 40 mm to 100 mm.

Advantageously, the severing or cutting of the borders from the thin glass ribbon is effected using at least one laser, wherein the laser melts and melts through the glass which is still viscous or viscoelastic after the drawing. For this purpose, a separate laser may be provided for each border, or the laser beam from a laser is split into two beams.

Here, the thin glass is not broken as with a laser scribing process, such as described for example in DE 693 04 194 T2, EP 0 872 303 B1, and U.S. Pat. No. 6,407,360, but is virtually melted through by introducing energy along a separation line by means of a laser beam in a very narrow region, so that due to the complete severing a fire-polished smooth cutting edge is formed which is completely free of microcracks. The melting-through is accomplished due to local heating at the impingement point of the laser beam thereby further lowering the viscosity of the glass relative to the surrounding glass which is still viscous due to the previous hot forming process from a melt or a preform. Due to surface tension the glass contracts in the heated region thereby becoming separated at the heated point.

For implementation, the thin glass may be advanced along a stationary laser, or the laser moves along a stationary thin glass, or both move relative to each other. Also, the laser may advance continuously along the predetermined separation line, or the laser may reciprocate one or more times along the separation line.

A suitable laser for severing the glass by melting, in particular in the range of viscosities, is a $CO_2$ laser, in particular a $CO_2$ laser having a wavelength in a range from 9.2 μm (micrometers) to 11.4 μm, preferably 10.6 μm, or a frequency-doubled $CO_2$ laser. This may be an AC laser, in particular a pulsed $CO_2$ laser, or a DC $CO_2$ laser (continuous-wave (CW) laser).

For performing the method of the invention, when using a $CO_2$ laser, an average laser power $P_{AV}$ of less than 500 W (Watts), preferably less than 300 W, more preferably less than 200 W will be suitable and sufficient, in particular with regard to the cutting speed. With regard to the quality of the cutting edge, an average laser power of less than 100 W is preferred, which is beneficial for producing high-quality cutting edges, though the cutting rate is low in this case.

Thus, if an AC $CO_2$ laser is employed, i.e. a $CO_2$ laser excited by a radio frequency field, RF excitation frequencies in a range from 10 kHz to 200 kHz are preferred. According to one exemplary embodiment, an RF field with a frequency of 20 kHz is employed for excitation, alternatively a slab laser with a frequency of 100 kHz.

Especially a pulsed $CO_2$ laser is particularly suitable for the invention. In such a laser, power is controlled by consecutive excitation pulses. By adjusting the pulse rate and in particular the pulse duration, the average power of the $CO_2$ laser can be set easily. For the average laser pulse rate or pulse repetition rate f of such a pulsed $CO_2$ laser, values from 5 kHz to 50 kHz (kilohertz) are preferred, in particular from 10 kHz to 30 kHz.

Furthermore, when using a pulsed $CO_2$ laser, a laser pulse duration $t_p$ from 0.1 μs (microseconds) to 500 μs is preferred, in particular a laser pulse duration $t_p$ from 1 μs to 100 μs.

According to the invention, the introduction of energy for separating the thin glass along the separation line may be performed with any suitable laser whose light is sufficiently absorbed in the glass to cause heating of the still viscous glass above the temperature prevailing at the point of impingement of the laser.

The severing through melting by means of a laser according to the invention is accomplished well before the transformation temperature of the glass is reached, i.e. at temperatures considerably above the transformation temperature. Due to the fact, that the glass is still viscoelastic when the border is severed, no or virtually no mechanical stresses are created during the severing.

The transformation point is defined as the temperature at which the glass passes from the viscoelastic range to the solid state during the cooling. The temperature-viscosity characteristic at this point depends on the annealing curve, the heating or cooling rate during the temperature change, and the chemical composition of the molten glass. Usually, the transformation point is near the annealing point at $10^{13}$ poise=$10^{13}$ dPa·s.

The invention is moreover based on the founding that in the range of viscosities from $10^7$ dPa·s to $10^{11}$ dPa·s, preferably from $10^8$ dPa·s to $10^{11}$ dPa·s, more preferably in a range from $10^9$ dPa·s to $10^{10}$ dPa·s the ribbon of molten glass has a sufficient mechanical stability at the location of separation of the borders. Any stresses are rapidly relieved due to the viscous properties of the molten glass ribbon, preferably in an annealing furnace.

In this range, the thin glass ribbon already is sufficiently stable in shape so that a secondary border due to drawing forces does not have to be expected or so that a formation thereof is prevented or at least occurs with significantly reduced thickness merely as a minimal border, and so that the severing edge is automatically rounding off or becomes round.

Due to the preferably short exposure to the laser, a small portion of the useful glass is heated during cutting.

Even in case of a very large laser focus ($D_L \approx 1$ mm) the temperature elevation will spread into the region of useful glass only by about 200 µm.

Therefore, due to capillary forces a secondary border may arise, with a maximum thickness $D_B$ (of the minimal border) at the edges of the thin glass ribbon for which applies:

$$D_B \leq 2 \cdot \sqrt{\frac{D_{use} \cdot 200 \text{ µm}}{\pi}},$$

wherein $D_{use}$ denotes the thickness of the thin glass ribbon in the center of the ribbon.

The thin glass ribbon according to the invention has edges that are rounded off and have a fire-polished surface. Fire-polished means that during the solidification of the glass in the hot forming process the glass surface is being formed only by the interface with the air and is not altered thereafter, neither mechanically nor chemically. This means, the thin glass produced in this way has no contact to other solid or liquid materials during the hot forming process.

After the severing of the borders, the ribbon of useful glass with approximately the same thickness of the glass at the periphery or the edges and in the center exhibits a particularly homogeneous temperature profile, so that annealing of both regions occurs uniformly and symmetrically and flatness of the glass is improved and formation of warp is minimized. Furthermore, stresses in the interface region to the border are reduced and hence the probability of an uncontrolled breakage of the glass is reduced, and therefore the thin glass ribbon can be manufactured with better reproducibility and better yield.

Alternatively, the borders may be severed from the thin glass ribbon by squeezing by means of wheels or rollers without breaking the glass which is still viscoelastic after the drawing process.

Thus, the borders are not separated by being broken off, rather they may be separated using a pair of opposed rollers, for example interengaging rollers. According to one embodiment, one or both of the rollers comprise a rotating blade.

By cooperation of the pair of rollers, the severing location of the border is narrowed or compressed to such an extent that the border is squeezed off and the glass is severed without breaking.

Due to the significantly reduced thicknesses of the borders or thicknesses of the edges of the thin glass ribbon produced according to the inventive method stresses in the useful glass product are considerably reduced, in particular in the coiled thin glass ribbon, so that the lifespan of the product is increased.

The method according to the invention is particularly suitable for a thin glass having an alkali oxide content of not more than 2 wt %, preferably not more than 1 wt %, more preferably not more than 0.05 wt %, most preferably not more than 0.03 wt %.

The present method is furthermore particularly suitable for a thin glass comprising the following components, in wt % on an oxide basis:

| | |
|---|---|
| $SiO_2$ | 40-75 |
| $Al_2O_3$ | 1-25 |
| $B_2O_3$ | 0-16 |
| alkaline earth oxides | 0-30 |
| alkali oxides | 0-2. |

The present method is moreover particularly suitable for a thin glass comprising the following components, in wt % on an oxide basis:

| | |
|---|---|
| $SiO_2$ | 45-75 |
| $Al_2O_3$ | 5-25 |
| $B_2O_3$ | 1-16 |
| alkaline earth oxides | 1-30 |
| alkali oxides | 0-1. |

According to a further embodiment, a lithium aluminosilicate glass is used for the thin glass, comprising the following composition (in wt %):

| Composition | (wt %) |
|---|---|
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass. The total amount of the total composition is 100 wt %.

Preferably, this lithium aluminosilicate glass has the following composition (in wt %):

| Composition | (wt %) |
|---|---|
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

As stated above, coloring oxides may be optionally added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass. The total amount of the total composition is 100 wt %.

Most preferably, the lithium aluminosilicate glass described above has the following composition (in wt %):

| Composition | (wt %) |
| --- | --- |
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

According to yet another embodiment of the invention, a soda-lime glass is drawn into an ultrathin flexible glass, wherein the soda-lime glass has the following composition (in wt %):

| Composition | (wt %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass, and the total amount of the total composition is 100 wt %.

Preferably, the soda-lime glass of the present invention has the following composition (in wt %):

| Composition | (wt %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass, and the total amount of the total composition is 100 wt %.

Most preferably, the soda-lime glass of the present invention has the following composition (in wt %):

| Composition | (wt %) |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass. The total amount of the total composition is 100 wt %.

According to one embodiment, the thin glass is a borosilicate glass of the following composition (in wt %):

| Composition | (wt %) |
| --- | --- |
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass. The total amount of the total composition is 100 wt %.

More preferably, the borosilicate glass of the present invention described above has the following composition (in wt %):

| Composition | (wt %) |
| --- | --- |
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass. The total amount of the total composition is 100 wt %.

Most preferably, this borosilicate glass has the following composition (in wt %):

| Composition | (wt %) |
| --- | --- |
| $SiO_2$ | 63-83 |
| $Al_2O_3$ | 0-7 |
| $B_2O_3$ | 5-18 |
| $Li_2O + Na_2O + K_2O$ | 4-14 |

| Composition | (wt %) |
|---|---|
| MgO + CaO + SrO + BaO + ZnO | 0-10 |
| $TiO_2$ + $ZrO_2$ | 0-3 |
| $P_2O_5$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may be further added to impart magnetic, photonic or optical functions to the glass. The total amount of the total composition is 100 wt %.

According to yet another embodiment of the invention, an alkali metal aluminosilicate glass of the following composition (in wt %) is used for the thin glass:

| Composition | (wt %) |
|---|---|
| $SiO_2$ | 40-75 |
| $Al_2O_3$ | 10-30 |
| $B_2O_3$ | 0-20 |
| $Li_2O$ + $Na_2O$ + $K_2O$ | 4-30 |
| MgO + CaO + SrO + BaO + ZnO | 0-15 |
| $TiO_2$ + $ZrO_2$ | 0-15 |
| $P_2O_5$ | 0-10 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

More preferably, the alkali metal aluminosilicate glass according to this embodiment of the invention has the following composition (in wt %):

| Composition | (wt %) |
|---|---|
| $SiO_2$ | 50-70 |
| $Al_2O_3$ | 10-27 |
| $B_2O_3$ | 0-18 |
| $Li_2O$ + $Na_2O$ + $K_2O$ | 5-28 |
| MgO + CaO + SrO + BaO + ZnO | 0-13 |
| $TiO_2$ + $ZrO_2$ | 0-13 |
| $P_2O_5$ | 0-9 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

Most preferably, this alkali aluminosilicate glass has the following composition (in wt %):

| Composition | (wt %) |
|---|---|
| $SiO_2$ | 55-68 |
| $Al_2O_3$ | 10-27 |
| $B_2O_3$ | 0-15 |
| $Li_2O$ + $Na_2O$ + $K_2O$ | 4-27 |
| MgO + CaO + SrO + BaO + ZnO | 0-12 |
| $TiO_2$ + $ZrO_2$ | 0-10 |
| $P_2O_5$ | 0-8 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

In one embodiment, the thin glass is produced from an aluminosilicate glass having a low alkali content, with the following composition (in wt %):

| Composition | (wt %) |
|---|---|
| $SiO_2$ | 50-75 |
| $Al_2O_3$ | 7-25 |
| $B_2O_3$ | 0-20 |
| $Li_2O$ + $Na_2O$ + $K_2O$ | 0-4 |
| MgO + CaO + SrO + BaO + ZnO | 5-25 |
| $TiO_2$ + $ZrO_2$ | 0-10 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

More preferably, this aluminosilicate glass of low alkali content has the following composition (in wt %):

| Composition | (wt %) |
|---|---|
| $SiO_2$ | 52-73 |
| $Al_2O_3$ | 7-23 |
| $B_2O_3$ | 0-18 |
| $Li_2O$ + $Na_2O$ + $K_2O$ | 0-4 |
| MgO + CaO + SrO + BaO + ZnO | 5-23 |
| $TiO_2$ + $ZrO_2$ | 0-10 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

Most preferably, this glass has the following composition (in wt %):

| Composition | (wt %) |
|---|---|
| $SiO_2$ | 53-71 |
| $Al_2O_3$ | 7-22 |
| $B_2O_3$ | 0-18 |
| $Li_2O$ + $Na_2O$ + $K_2O$ | 0-4 |
| MgO + CaO + SrO + BaO + ZnO | 5-22 |
| $TiO_2$ + $ZrO_2$ | 0-8 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$. From 0 to 2 wt % of $As_2O_3$, $Sb_2O_3$, $SnO_2$, $SO_3$, Cl, F, and/or $CeO_2$ may be added as a refining agent. From 0 to 5 wt % of rare earth oxides may further be added to impart magnetic, photonic or optical functions to the glass. The total amount of the total composition is 100 wt %.

According to one embodiment of the invention, the thin glass ribbon or glass film has a thickness of less than 300 μm, preferably less than 250 μm, more preferably less than 100 μm, most preferably less than 50 μm. However, according to yet a further variation of the invention, the thickness is at least 5 μm, preferably at least 10 μm, more preferably at least 15 μm. Preferred glass thicknesses of the thin glass ribbon are 15 μm, 25 μm, 30 μm, 35 μm, 50 μm, 55 μm, 70 μm, 80 μm, 100 μm, 130 μm, 145 μm, 160 μm, 190 μm, 210 μm, and 280 μm.

In a preferred embodiment of the inventive method, such a thin glass ribbon is produced from a molten, preferably low-alkali glass in a drawing process or a melt-drawing process. For example, the so-called down-draw process is described in WO 02/051757 A2, the so-called overflow down-draw fusion process in WO 03/051783 A1, and the so-called new fusion-draw process in WO 2012/158232 A2, wherein the device guiding the molten glass comprises a forming wedge and a forming blade, as described in particular by way of FIG. 2 of WO 2012/158232 A2.

Generally, in a glass drawing process, bubble-free and well homogenized glass flows into a glass reservoir called drawing tank. The drawing tank is usually made of noble metals such as platinum or platinum alloys. Below the drawing tank, an nozzle means is arranged, in particular with a slot orifice. The size and the shape of this orifice defines the flow of the thin glass ribbon that is being drawn and the thickness distribution across the width thereof. The thin glass ribbon is usually draw downwards using drawing rollers, at a rate from about 2 to 110 meters per minute (33 mm/s to 1833 mm/s), preferably from 4 meters per minute to 50 meters per minute (66 mm/s to 833 mm/s), depending on the glass thickness, and then passes through an annealing furnace, followed by a drawing device comprising drawing rollers. The speed of the drawing rollers determines the thickness of the glass ribbon, inter alia. According to one exemplary embodiment, the glass ribbon is drawn at a rate of 7.2 meters per minute.

DESCRIPTION OF THE DRAWINGS

The invention will now be explained in more detail with reference to the accompanying figures, wherein.

DETAILED DESCRIPTION

By way of example, an alkali-free glass is employed which is marketed by Schott AG, Mainz, under the name AF32®, and which has the following composition, in wt %:

| | |
|---|---|
| $SiO_2$ | 61 |
| $Al_2O_3$ | 18 |
| $B_2O_3$ | 10 |
| CaO | 5 |
| BaO | 3 |
| MgO | 3 |

Glass AF32® has a density ρ of 2430 kg/m³ and a surface tension γ of 0.3 N/m, a thermal conductivity λ of 2 W/mK, and a specific heat capacity $c_p$ of 1360 J/kgK.

The transformation temperature $T_g$ of the glass AF32® is 713° C.

For manufacturing the thin glass ribbon with a target thickness of 100 µm or 50 µm, the glass is heated in a furnace and is drawn through an orifice having a lateral width of 800 mm, for example. A suitable opening width of the orifice is between 8 mm and 18 mm. The temperature of the orifice is preferably above 1100° C. In this manner, the thin glass ribbon may be drawn at a flow rate of more than 1.5 kg per minute, at a drawing rate of 6 m/min and more.

Figure 1:
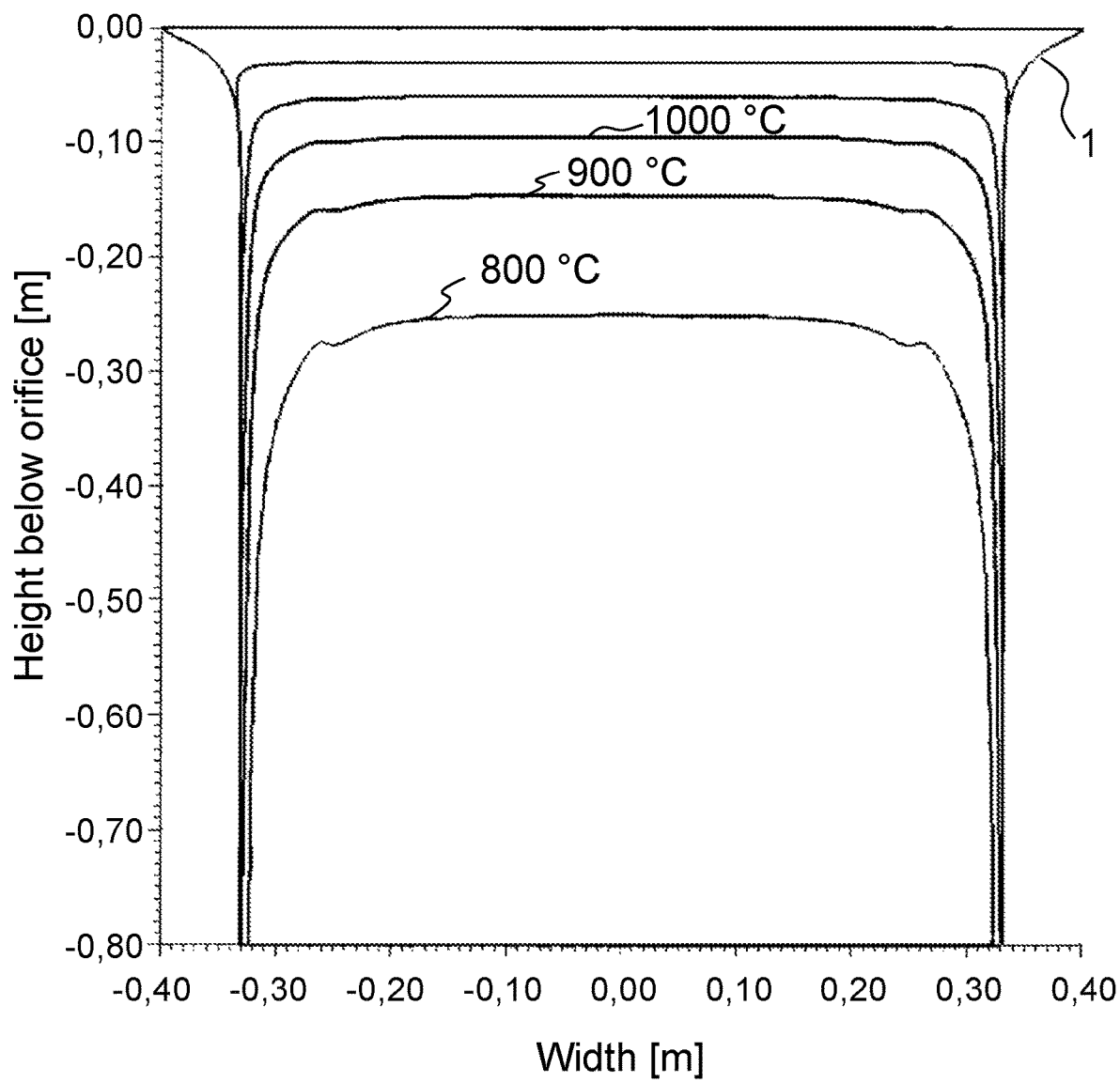
FIG. 1 shows a diagram of isotherms of the glass ribbon as a function of the height below the orifice and the width of the glass ribbon.

FIG. 1 shows a diagram of the isotherms at 1000° C., 900° C., and 800° C. of the thin glass ribbon 1 as a function of the height below the orifice and the width of the glass ribbon.

While being drawn out of the orifice the glass ribbon is cooling down, and at the periphery or the edges of the thin glass ribbon 1 that is being drawn increasing thickenings, called borders, are forming on the narrowing glass ribbon, due to the process and due to material properties of the highly viscous molten glass. Thereby, temperature inhomogeneities arise within the glass ribbon, which may lead to stresses and unevennesses of the glass or warp of the glass.

At the borders, the glass can be drawn out of the orifice and can be guided.

Figure 2:
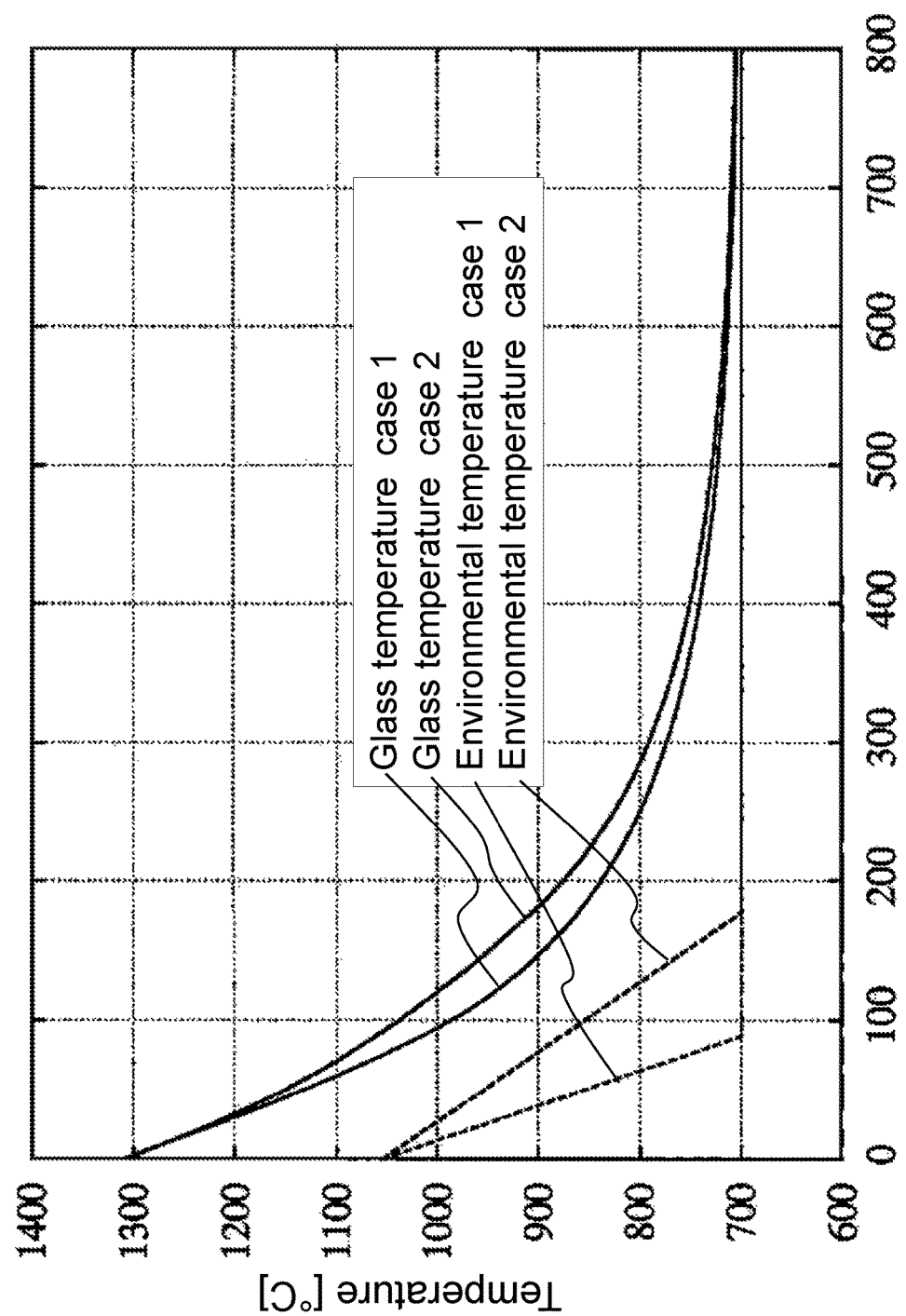
FIG. 2 shows a diagram of vertical temperature profiles of the glass ribbon and the environment for two cases (case 1 and case 2) of different muffle temperature profiles as a function of the distance from the orifice.

FIG. 2 shows a diagram of vertical temperature profiles of the glass ribbon and of the environment for two cases of different muffle temperature profiles as a function of the distance from the orifice.

Two cases (Case 1 and Case 2) are considered, with the vertical muffle temperature profiles of:

Case 1 (with a temperature gradient of 4000 K/m): T(y)=max (700° C.; 1055° C.)+4000*y; and Case 2 (with a temperature gradient of 2000 K/m): T(y)=max (700° C.; 1055° C.)+2000*y.

Here, y denotes the distance to the drawing orifice in meters. The resulting glass temperatures for the thin glass ribbon having a thickness of 50 µm and for the thin glass ribbon having a thickness of 100 µm are virtually identical.

Figure 3:
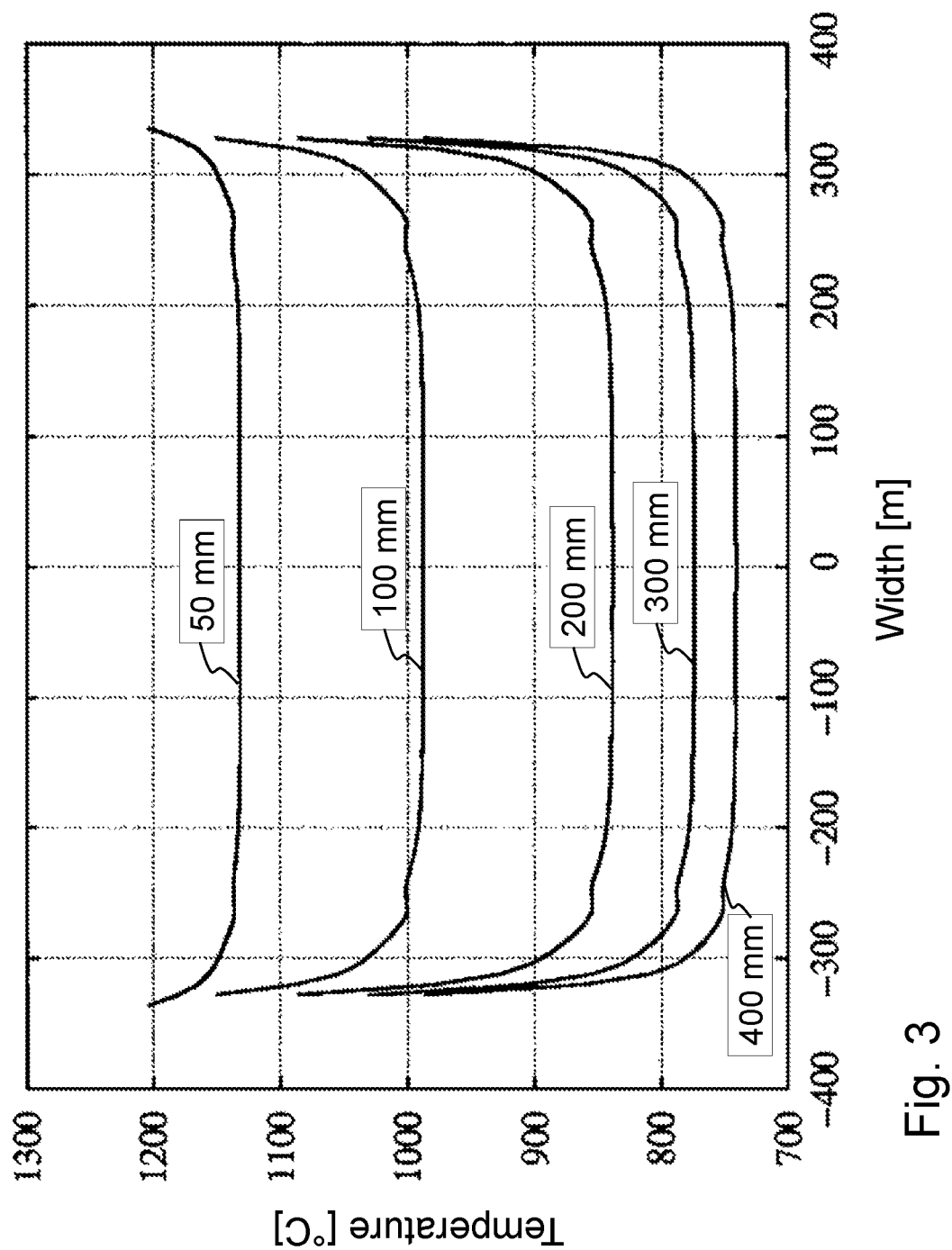
FIG. 3 shows a diagram of temperature profiles at different heights below the orifice as a function of the width of the glass ribbon for case 1, with a thickness of the glass ribbon of 100 μm.
Figure 4:
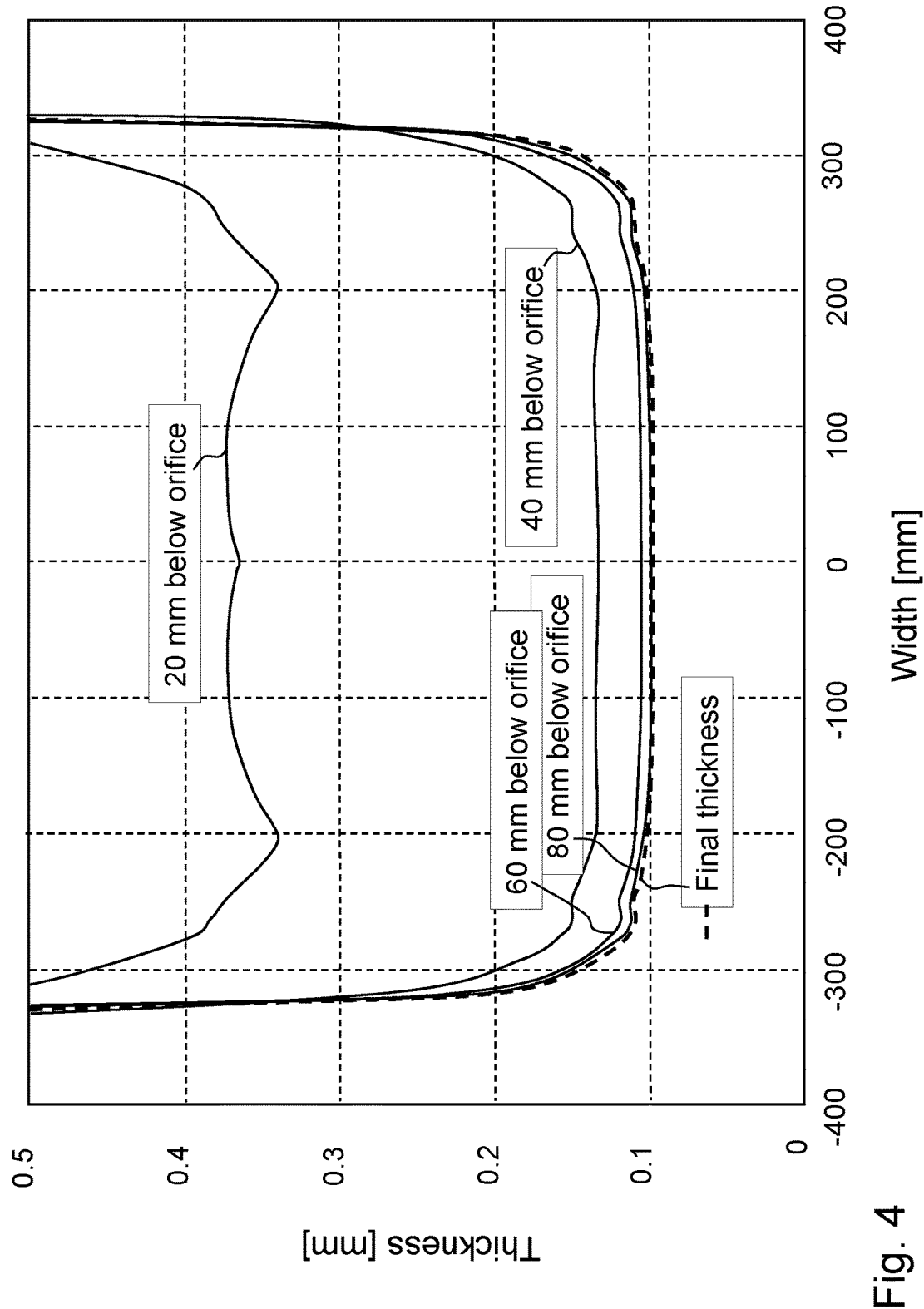
FIG. 4 shows a diagram of thickness profiles at different heights below the orifice as a function of the width of the glass ribbon for case 1, with a thickness of the glass ribbon of 100 μm.
Figure 5:
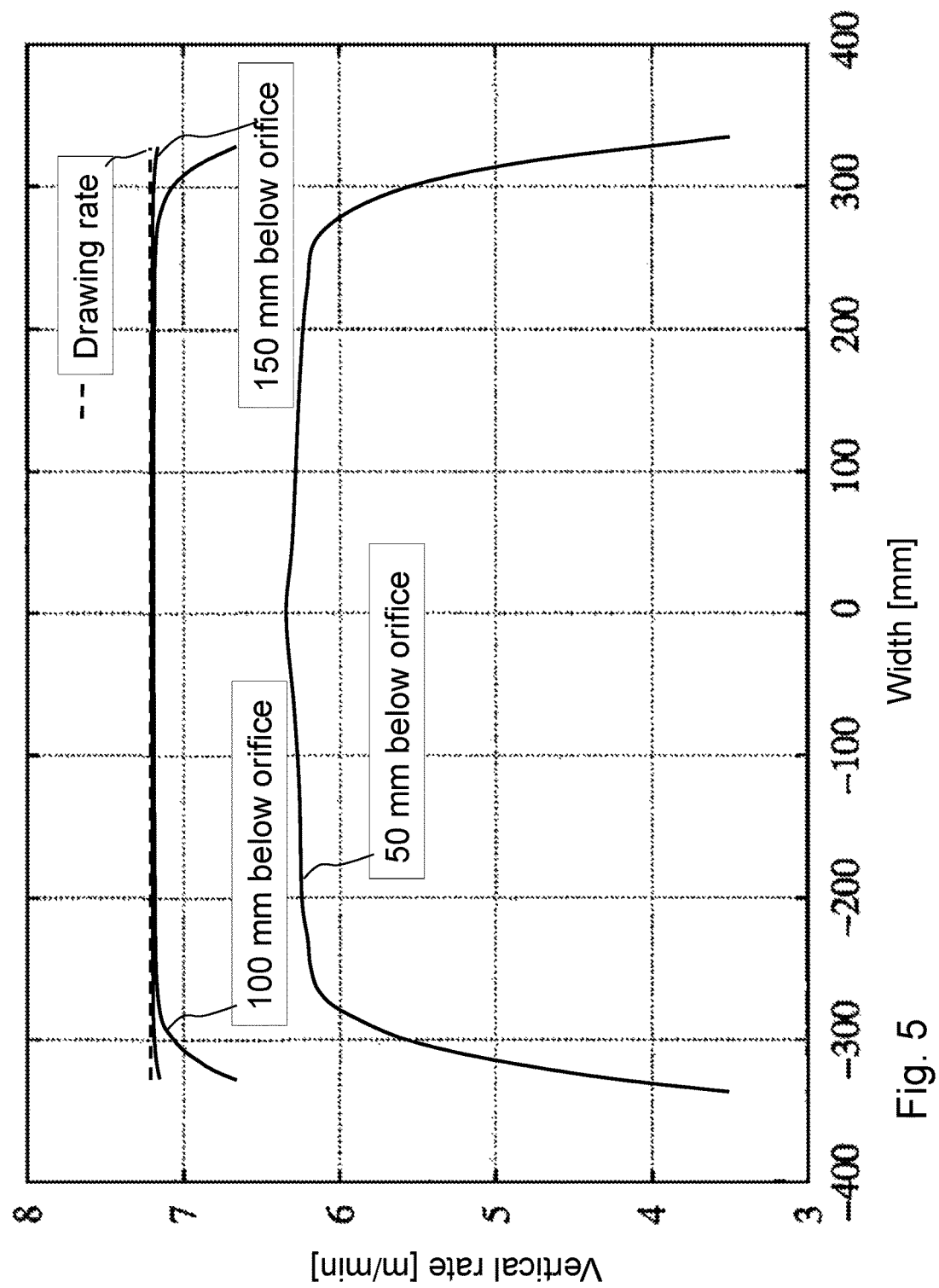
FIG. 5 shows a diagram of rate profiles at different heights below the orifice as a function of the width of the glass ribbon for case 1, with a thickness of the glass ribbon of 100 μm.
Figure 6:
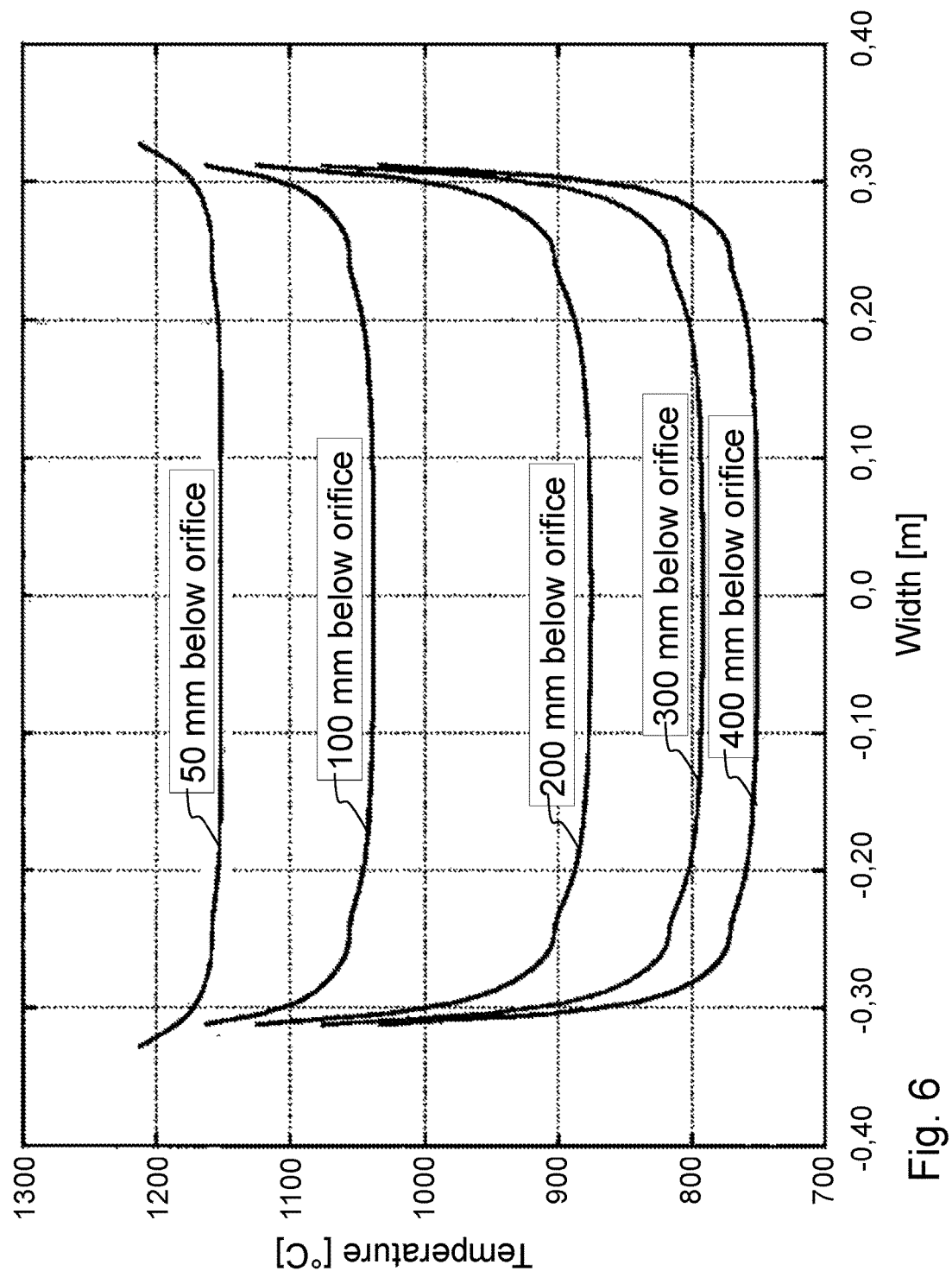
FIG. 6 shows a diagram of temperature profiles at different heights below the orifice as a function of the width of the glass ribbon for case 2, with a thickness of the glass ribbon of 100 μm.
Figure 7:
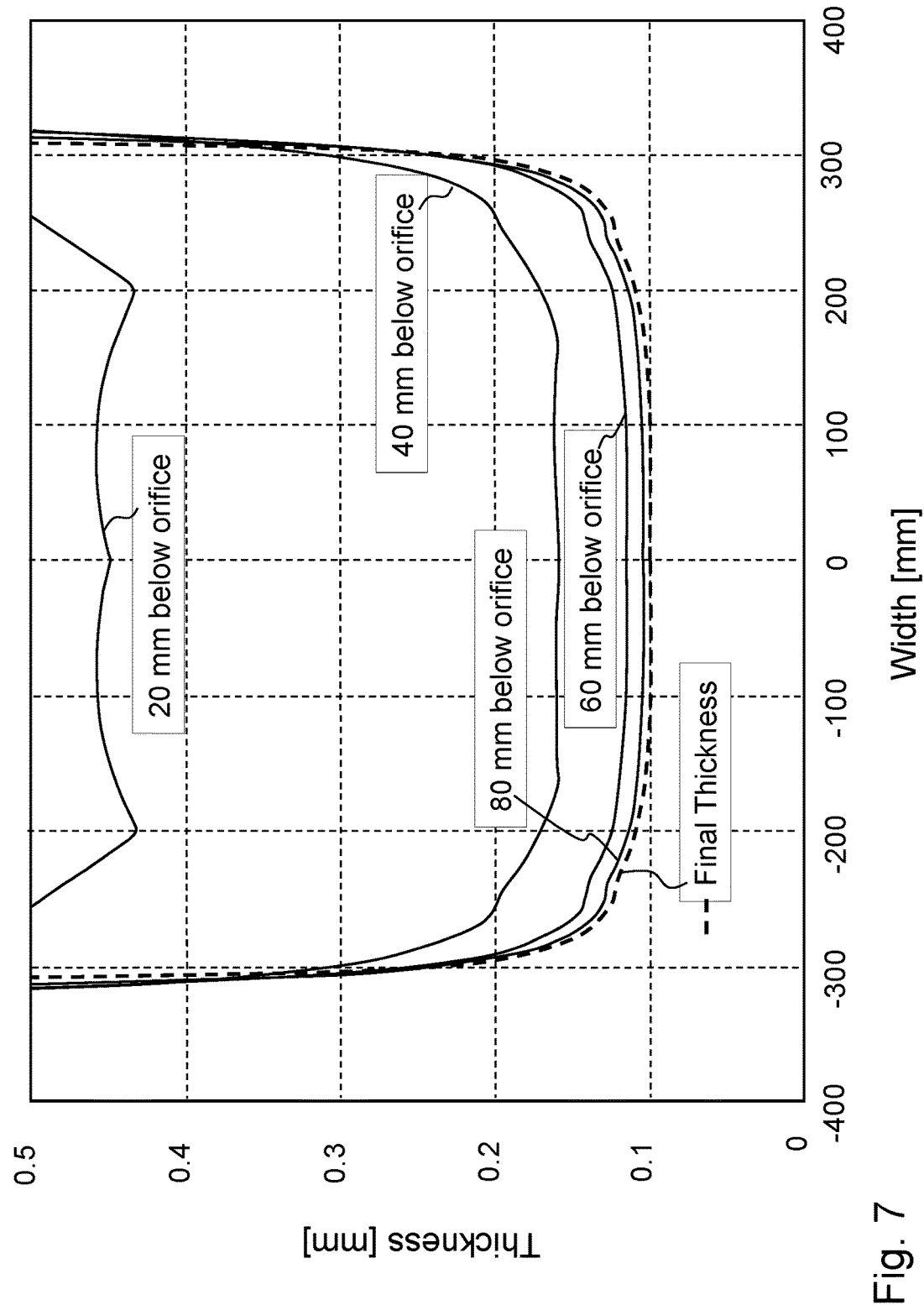
FIG. 7 shows a diagram of thickness profiles at different heights below the orifice as a function of the width of the glass ribbon for case 2, with a thickness of the glass ribbon of 100 μm.
Figure 8:
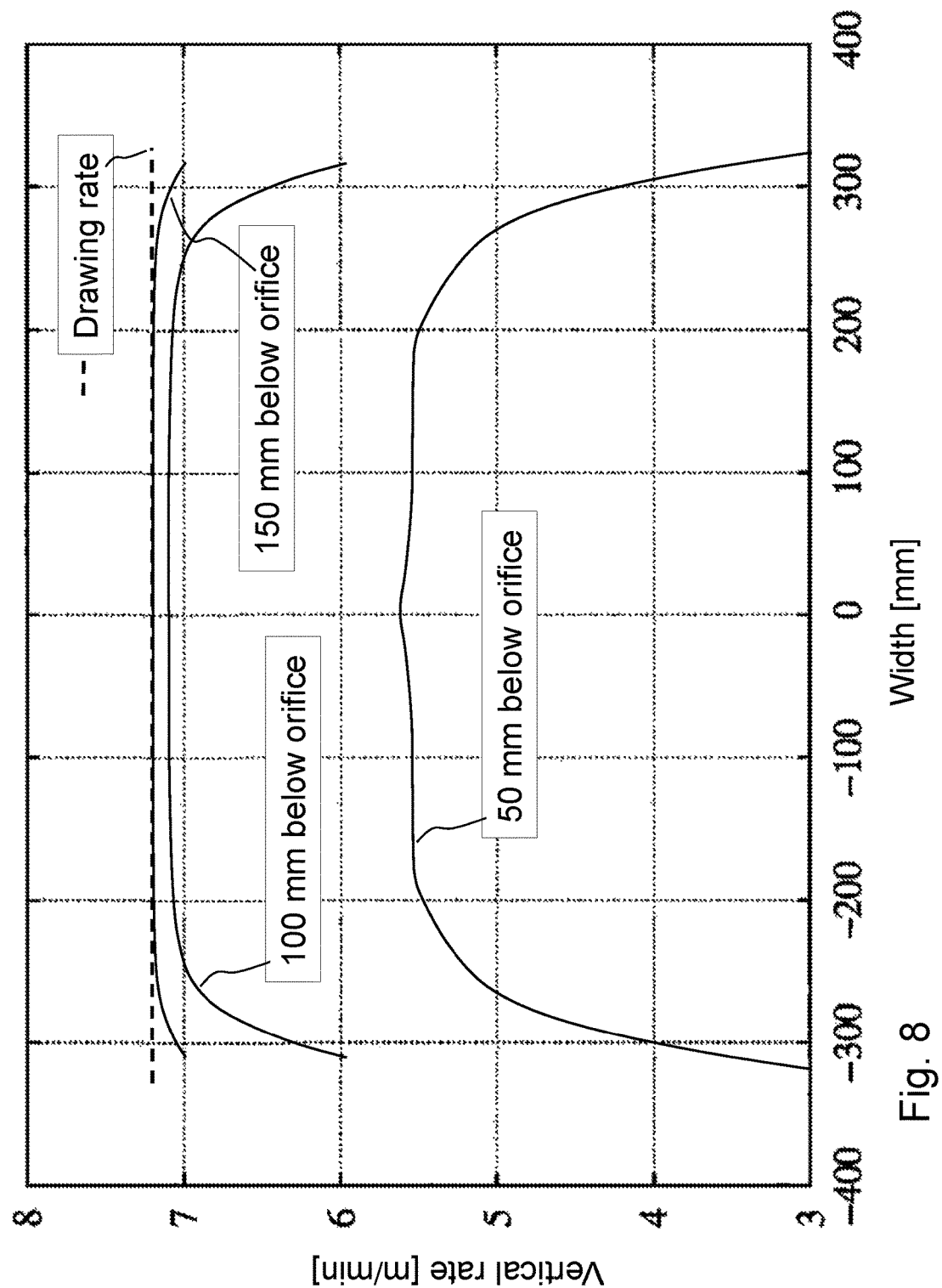
FIG. 8 shows a diagram of rate profiles at different heights below the orifice as a function of the width of the glass ribbon for case 2, with a thickness of the glass ribbon of 100 μm.

FIGS. 3 to 8 each show diagrams with a thickness of the glass ribbon of 100 µm, with FIG. 3 to FIG. 5 given for case 1, and FIG. 6 to FIG. 8 given for case 2.

FIG. 3 and FIG. 6 each show a diagram of temperature profiles at different heights of 50 mm, 100 mm, 200 mm, 300 mm, and 400 mm below the orifice as a function of the width of the glass ribbon, for case 1 and case 2, respectively, with a thickness of the glass ribbon of 100 µm in each case.

As can be seen therefrom, up to approximately 400 mm below the orifice the temperature is still above the transformation temperature of the glass AF32® of 713° C. Therefore, the range with a distance of less than and up to 400 mm below the orifice is preferred for severing the borders.

FIG. 4 and FIG. 7 each show a diagram of thickness profiles at different heights of 20 mm, 40 mm, 60 mm, and 80 mm below the orifice as a function of the width of the glass ribbon, for case 1 and case 2, respectively, with a thickness of the glass ribbon of 100 µm in each case.

As can be seen from FIG. 4 and FIG. 7, respectively, the final thickness profile (for 100 µm) of the glass ribbon, as shown in dashed lines, is already almost obtained at approximately 80 mm below the orifice. Therefore, the range with a distance of more than 80 mm below the orifice is preferred for severing the borders.

FIG. 5 and FIG. 8 each show a diagram of rate profiles at different heights of 50 mm, 100 mm, and 150 mm below the orifice as a function of the width of the glass ribbon, for case 1 and case 2, respectively, with a thickness of the glass ribbon of 100 µm in each case.

As can be seen from FIG. 5 and FIG. 8, respectively, at approximately 150 mm the thin glass ribbon advances almost like a solid body, with the drawing rate of 7.2 m/min, represented in dashed lines. Therefore, if the borders are severed in this range, the central region of the thin glass ribbon and in particular the useful glass ribbon will not again experience constriction caused by drawing forces.

Thus, it becomes clear from the diagrams of FIGS. 3 to 5 and FIGS. 6 to 8, respectively, that the process of severing the borders from the thin glass ribbon should be performed at a distance in a range from 80 mm to 400 mm, preferably from 150 mm to 400 mm, more preferably in a range from 150 mm to 300 mm from the orifice.

Figure 9:
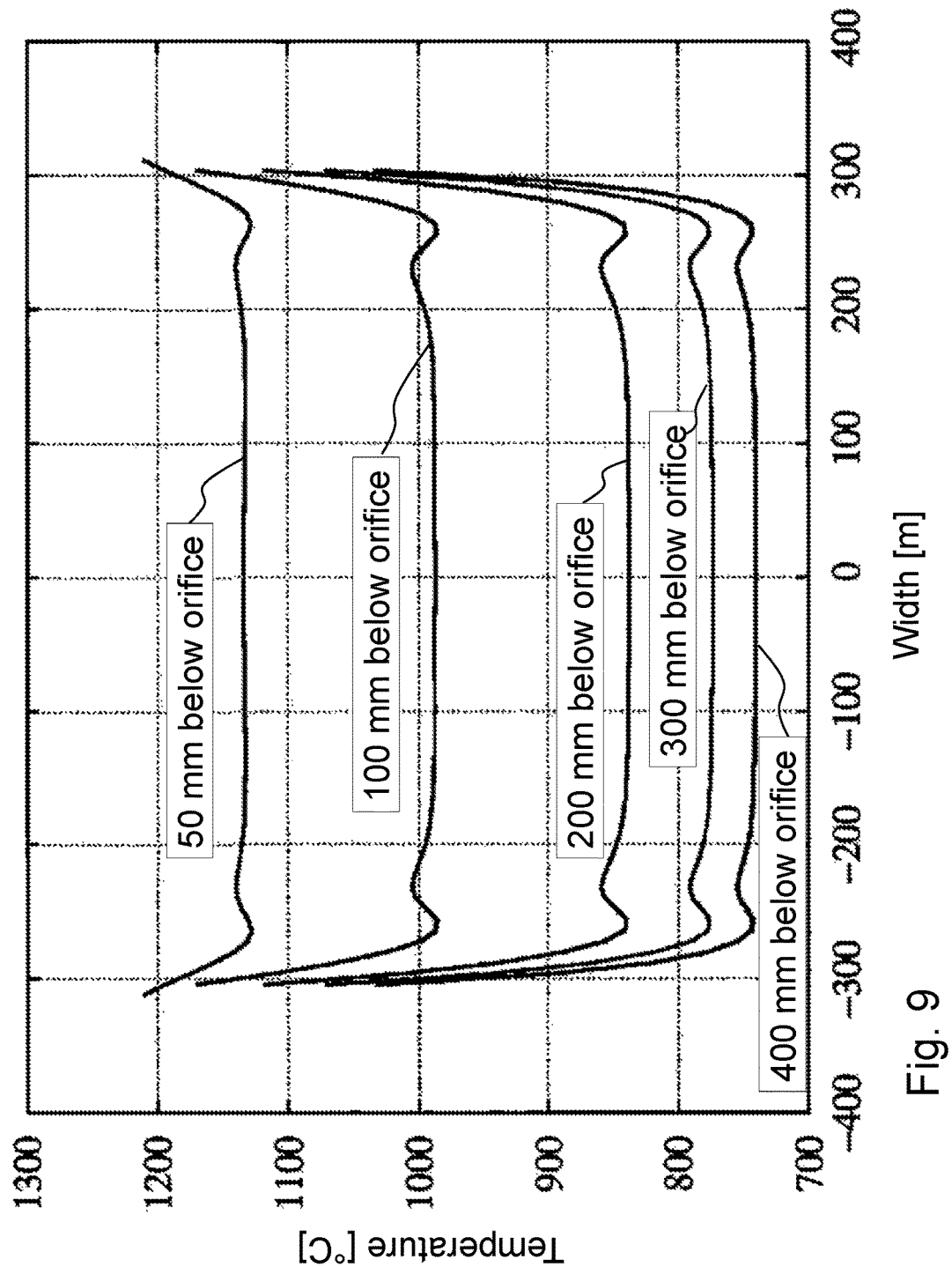
FIG. 9 shows a diagram of temperature profiles at different heights below the orifice as a function of the width of the glass ribbon for case 1, with a thickness of the glass ribbon of 50 μm.
Figure 10:
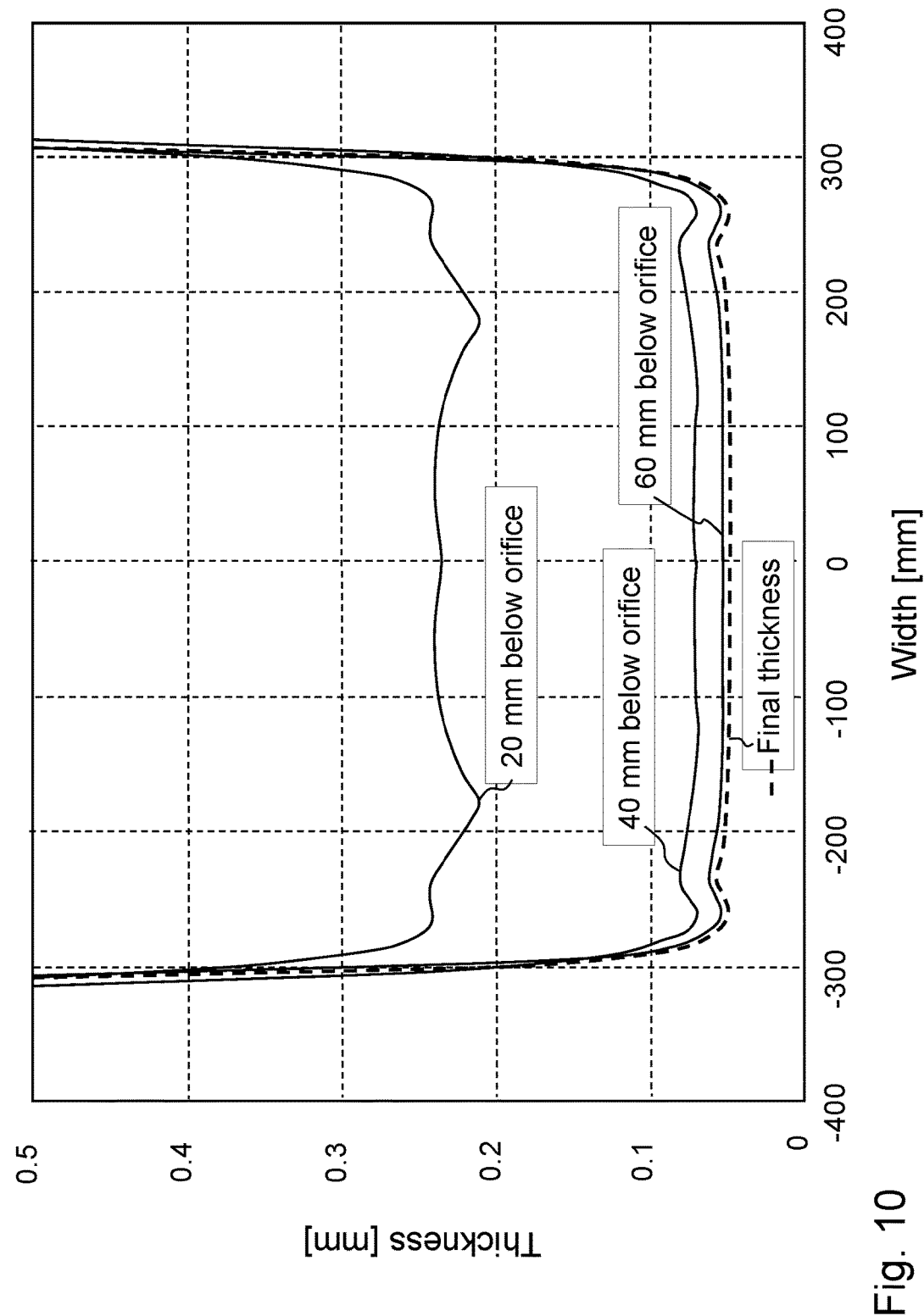
FIG. 10 shows a diagram of thickness profiles at different heights below the orifice as a function of the width of the glass ribbon for case 1 and with a thickness of the glass ribbon of 50 μm.
Figure 11:
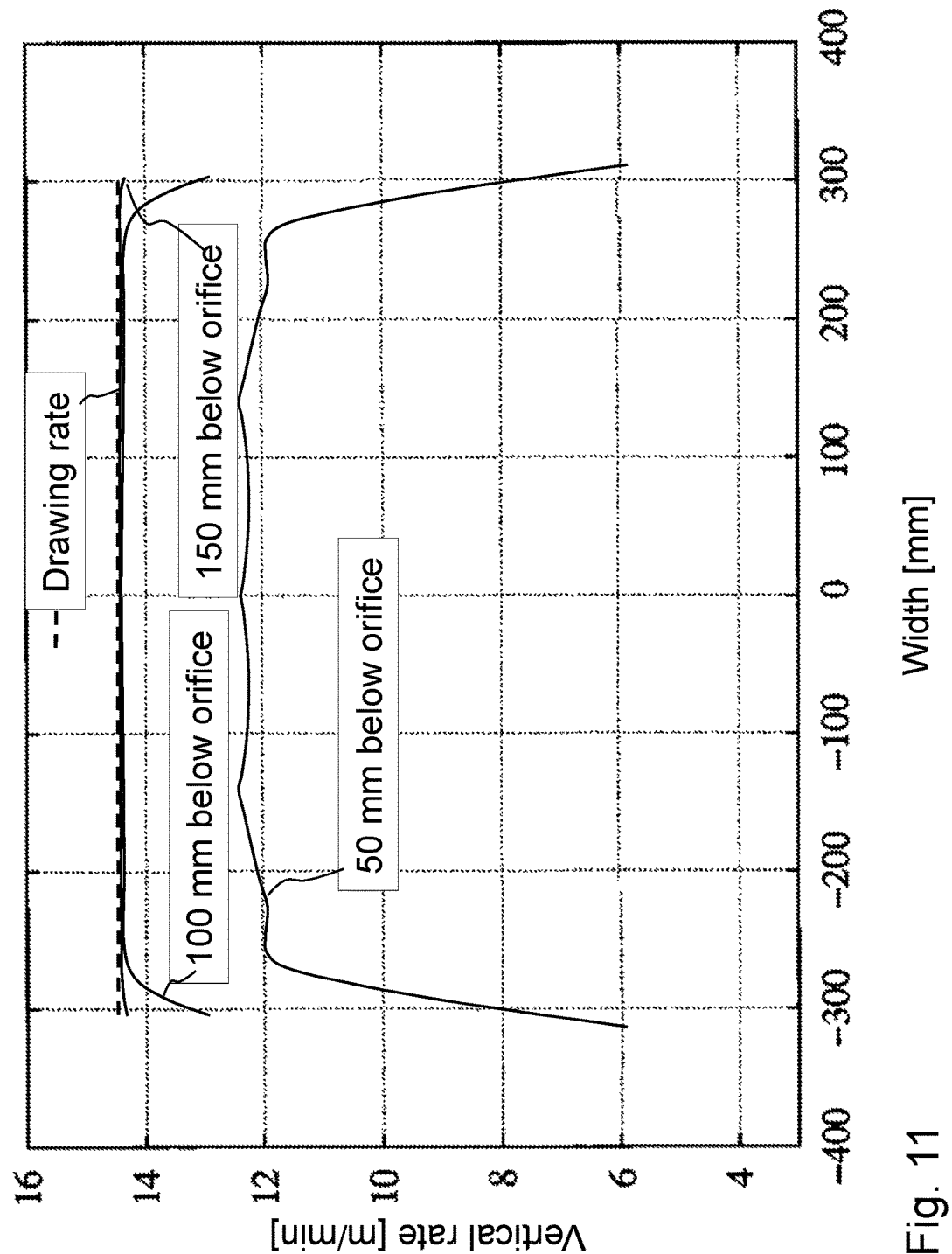
FIG. 11 shows a diagram of rate profiles at different heights below the orifice as a function of the width of the glass ribbon for case 1, with a thickness of the glass ribbon of 50 μm.
Figure 12:
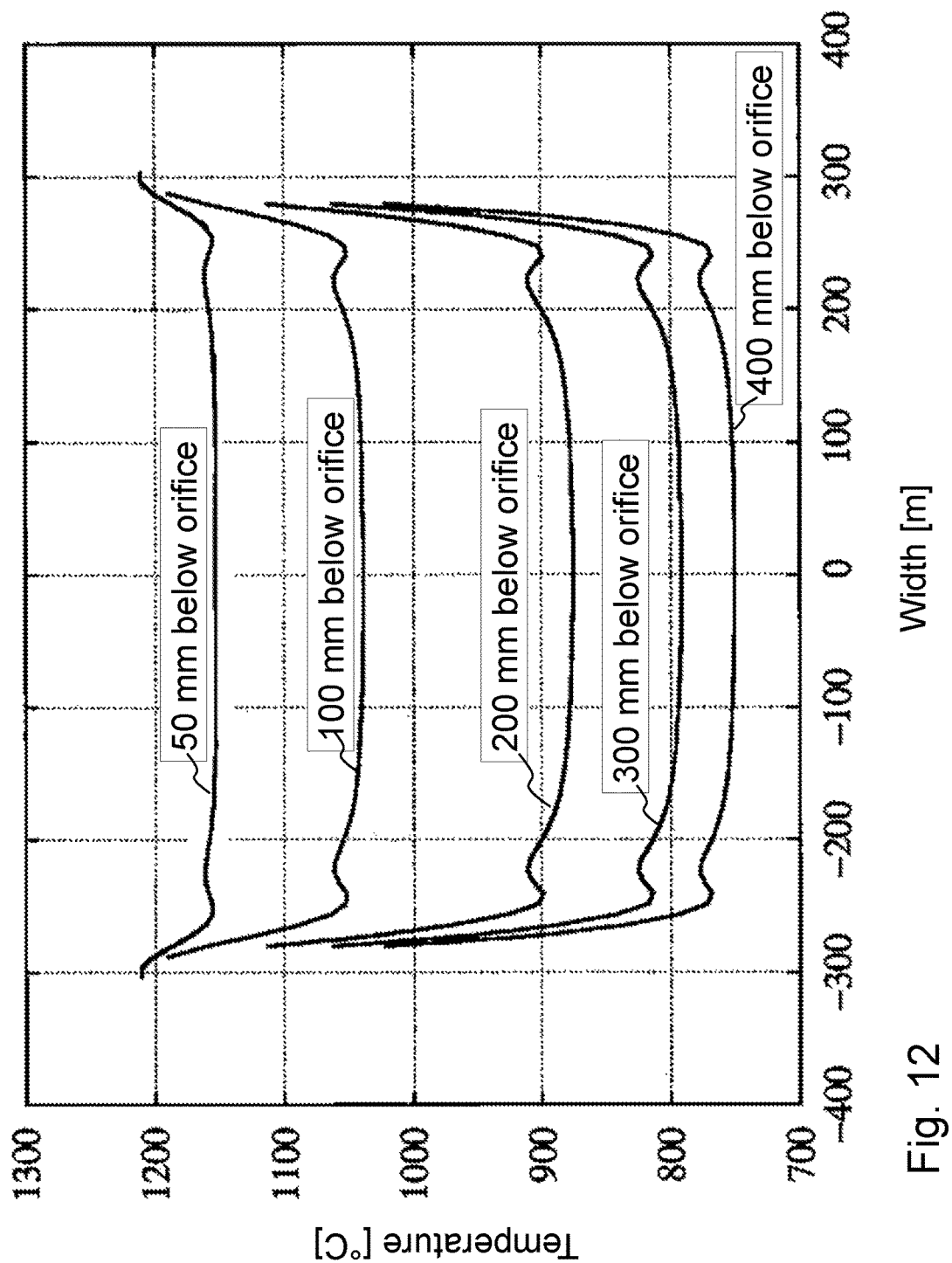
FIG. 12 shows a diagram of temperature profiles at different heights below the orifice as a function of the width of the glass ribbon for case 2, with a thickness of the glass ribbon of 50 μm.
Figure 13:
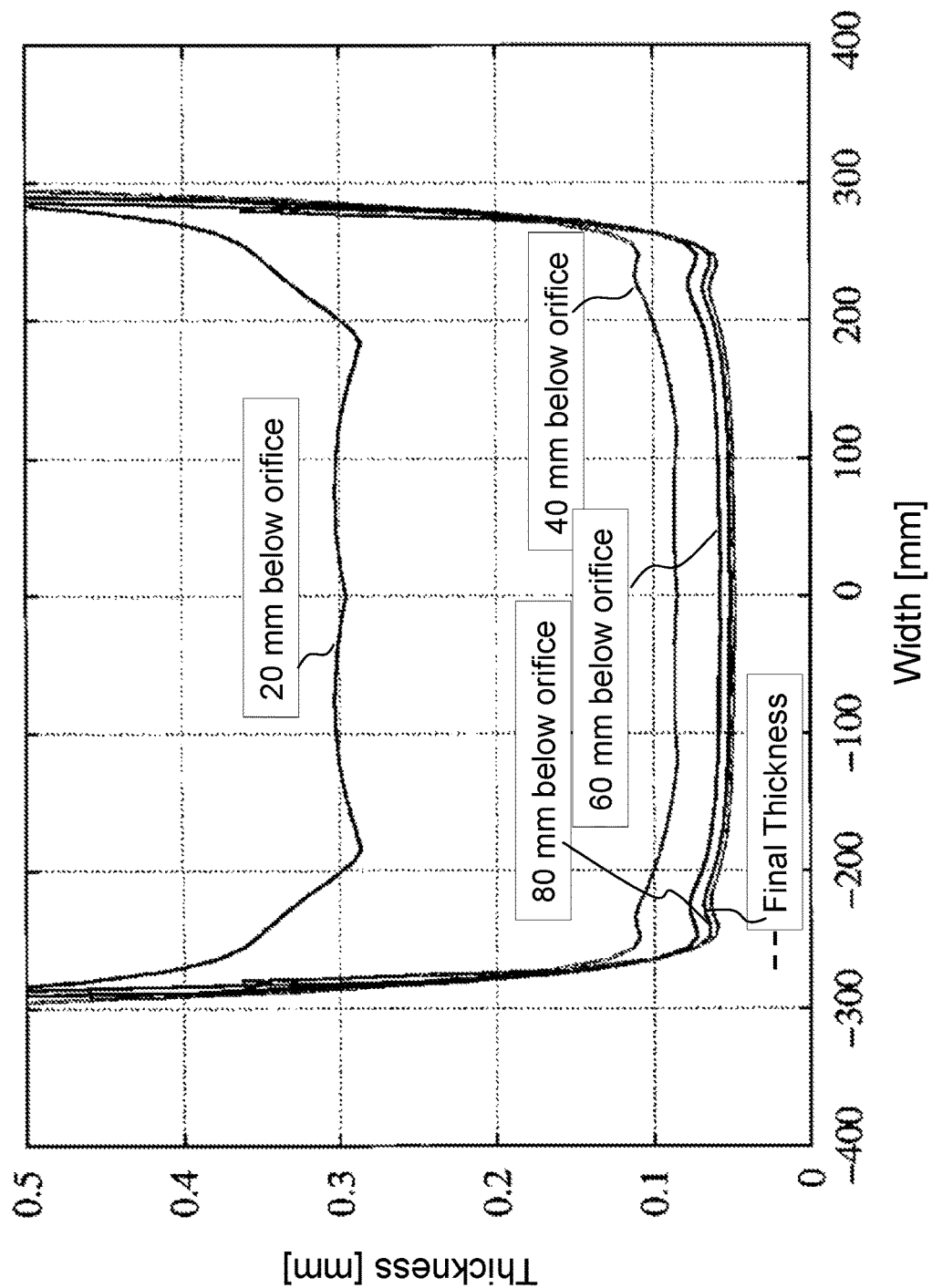
FIG. 13 shows a diagram of thickness profiles at different heights below the orifice as a function of the width of the glass ribbon for case 2, with a thickness of the glass ribbon of 50 μm.
Figure 14:
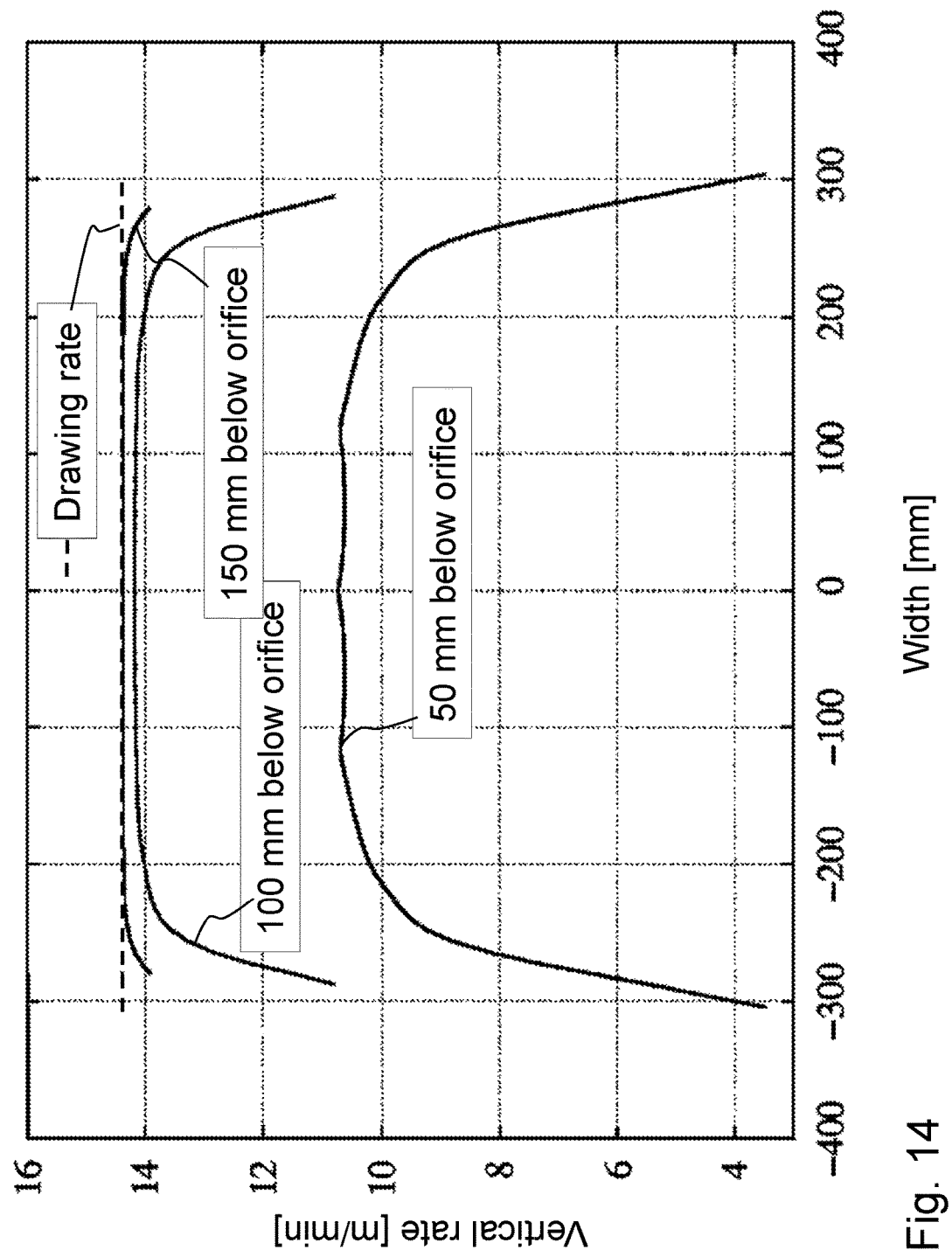
FIG. 14 shows a diagram of rate profiles at different heights below the orifice as a function of the width of the glass ribbon for case 2, with a thickness of the glass ribbon of 50 μm.

FIGS. 9 to 14 show the corresponding diagrams as in FIGS. 3 to 8, but with a thickness of the glass ribbon of 50 µm, with FIG. 9 to FIG. 11 given for case 1, and FIG. 12 to FIG. 14 given for case 2.

Thus, the following applies:

FIG. 9 and FIG. 12 each show a diagram of temperature profiles at different heights of 50 mm, 100 mm, 200 mm, 300 mm, and 400 mm below the orifice as a function of the width of the glass ribbon, for case 1 and case 2, respectively, with a thickness of the glass ribbon of 50 µm in each case.

As can be seen therefrom, up to approximately 400 mm below the orifice the temperature is still above the transformation temperature of the glass AF32® of 713° C. Therefore, without limitation to the specific exemplary embodiment, the range with a distance of less than and up to 400 mm below the orifice is preferred for severing the borders.

FIG. 10 and FIG. 13 each show a diagram of thickness profiles at different heights of 20 mm, 40 mm, 60 mm, and 80 mm below the orifice as a function of the width of the glass ribbon, for case 1 and case 2, respectively, with a thickness of the glass ribbon of 50 µm in each case.

As can be seen from FIG. 10 and FIG. 13, respectively, the final thickness profile (for 50 µm) of the glass ribbon, as shown in dashed lines, is already almost obtained at approximately 80 mm below the orifice.

Therefore, without limitation to the specific exemplary embodiment, the range with a distance of more than 80 mm below the orifice is preferred for severing the borders.

FIG. 11 and FIG. 14 each show a diagram of rate profiles at different heights of 50 mm, 100 mm, and 150 mm below the orifice as a function of the width of the glass ribbon, for case 1 and case 2, respectively, with a thickness of the glass ribbon of 50 µm in each case.

As can be seen from FIG. 11 and FIG. 14, respectively, at approximately 150 mm the thin glass ribbon advances almost like a solid body, with the drawing rate of 7.2 m/min, as represented in dashed lines. Therefore, if the borders are severed in this range, the central region of the thin glass ribbon and in particular the useful glass ribbon will not again experience constriction caused by drawing forces.

Thus, it becomes clear from the diagrams of FIGS. 3 to 14 that the process of severing the borders from the thin glass ribbon should be performed at a distance in a range from 80 mm to 400 mm, preferably from 150 mm to 400 mm, more preferably in a range from 150 mm to 300 mm from the orifice.

Accordingly, an apparatus 2 is preferably employed which comprises a device for guiding the molten glass 3, preferably a drawing orifice 4, and a device for severing the borders 7, 8 from the thin glass ribbon 1, which severing device is arranged at a distance in a range from 80 mm (millimeters) to 400 mm, preferably from 150 mm to 400 mm, more preferably from 150 mm to 300 mm from the nearest melt contact surface of the device guiding the molten glass 3, in particular the drawing orifice 4. Examples of such an apparatus 2 will be described below with reference to FIG. 15 and FIG. 17.

In addition, it can be seen from the diagrams that the thickenings in the peripheral regions of the thin glass ribbon 1, i.e. the borders 7, 8, have a width in a range from 30 mm (millimeter) to 150 mm, in particular in a range from 50 mm to 100 mm of the entire thin glass ribbon 1. Consequently, it is preferred to sever precisely this peripheral width region that exhibits the temperature inhomogeneities, in order to avoid tensions and unevenness or warp of the glass. With respect to the width of a thin glass ribbon 1, according to one embodiment of the invention without limitation to the illustrated exemplary embodiments, borders 7, 8 are separated which have an added width of at least ⅒, preferably at least ⅛ of the width of the thin glass ribbon 1 after the borders 7, 8 have been severed. Generally, the width of borders 7, 8 is less dependent on the absolute width of the thin glass ribbon 1 that is being drawn. Typically, without being limited to the exemplary embodiments, good homogenization of the temperature profile during the cooling of the thin glass ribbon 1 can be achieved and so permanent mechanical stresses may be effectively suppressed by severing a strip of more than 30 millimeters. Therefore, according to one embodiment of the invention it is suggested that borders 7, 8 are severed which each have a width of at least 30 millimeters, preferably at least 40 millimeters.

According to one exemplary embodiment, borders 7, 8 each having a width of 50 millimeters are severed from a thin glass ribbon 1 which has a width of 600 millimeters.

As can be seen in particular from FIGS. 1, 3, 6, 9, and 12, the thin glass ribbon 1 has a particularly homogeneous temperature profile in the center of the ribbon, and therefore the useful glass ribbon after separation of borders 7, 8 as well. For example, if in the example shown in FIG. 6 the border is separated at a distance of 300 or 400 millimeters below the orifice and so that a glass ribbon of a width of 0.4 meters is obtained, the difference in temperature from the edge to the center will be less than 20° C. in both cases. In case of a smaller distance of the severing location from the orifice the temperature difference will even be smaller. Generally, without being limited to the exemplary embodiments, it is therefore provided according to one variation of the invention that when the borders have been severed, the thin glass ribbon 1 exhibits a temperature difference between the edge and the center of the ribbon of less than 20° C., measured perpendicular to the drawing direction.

Upstream of the severing location 10 or cut, borders 7, 8 preferably serve to span the thin glass ribbon 1 perpendicularly to the moving direction. Because of their greater thickness as compared to the center of thin glass ribbon 1 or the useful glass, borders 7, 8 are more rigid.

Figure 15:
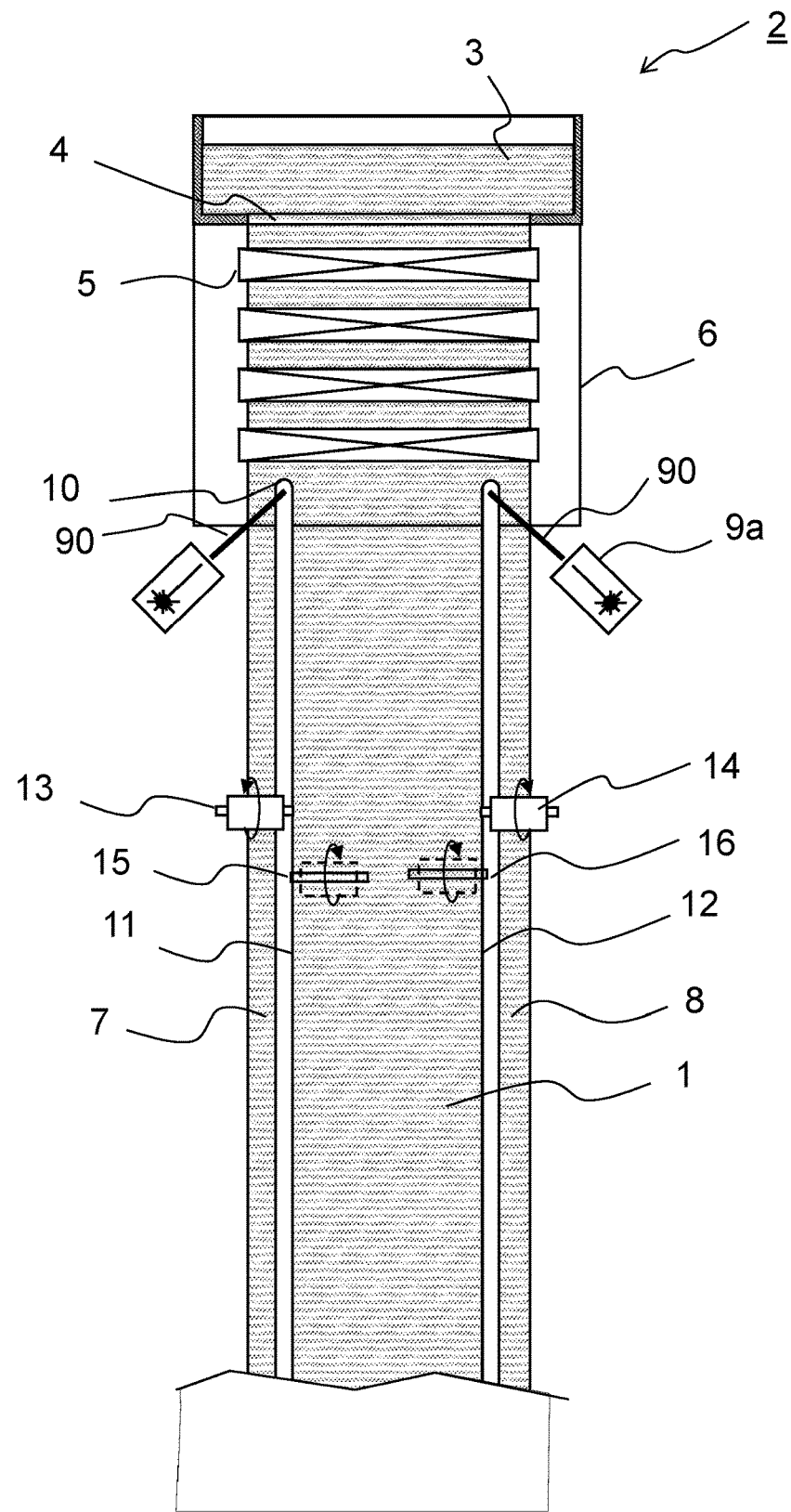
FIG. 15 is a schematic view of the apparatus according to the invention, with a laser as a severing device.
Figure 17:
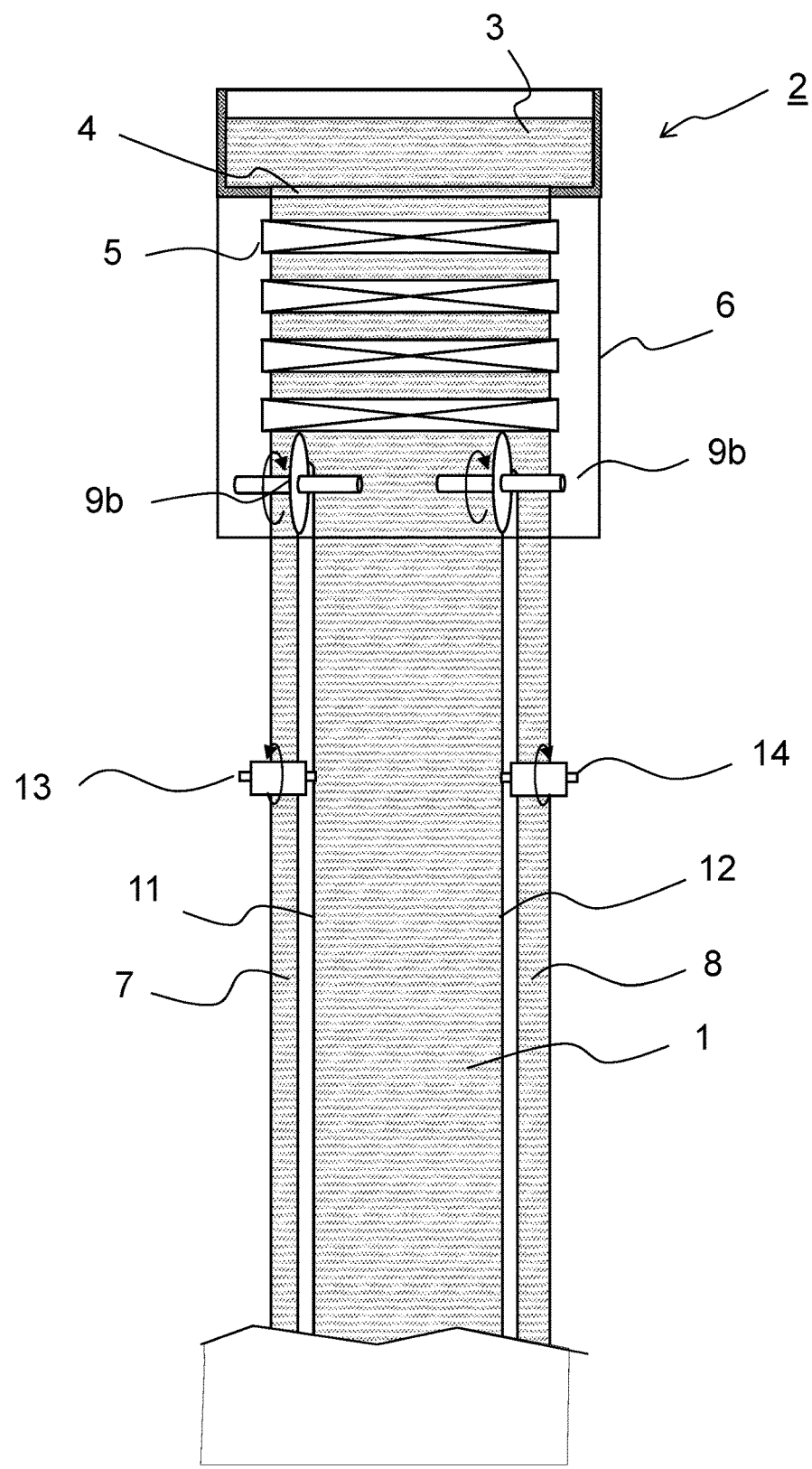
FIG. 17 is a schematic view of the apparatus according to the invention, with wheels as a severing device.

In order to provide an improved method which allows to sever the borders 7, 8 so as to form edges 11, 12 of high mechanical quality while preventing a formation of new secondary borders after the severing from the ribbon-shaped molten glass 3 or at least reducing the thickness of the secondary borders as compared to the original borders 7, 8, and so as to avoid stresses in the glass after the severing process, which stresses could otherwise cause unevenness or warp of the glass, the invention provides the following method described below, wherein apparatuses 2 as shown in FIGS. 15 and 17 are preferred for performing the method.

For manufacturing a thin glass ribbon 1 of particularly high quality the glass mentioned above is used, for example.

For performing the method for producing a thin glass ribbon 1, a preferred apparatus 2 according to FIG. 15 comprises a device for guiding the molten glass 3, preferably a drawing orifice 4, which is disposed inside heating means 5 and a heating muffle 6. The thin glass ribbon 1 is drawn from the molten glass 3, whereby borders 7, 8 are forming at both edges of the thin glass ribbon 1, which borders have a greater thickness than the center of the thin glass ribbon 1. After having been drawn from the molten glass 3, the thin glass ribbon 1 cools down, and the borders 7, 8 are severed from the thin glass ribbon 1 by means of a severing device 9, in particular a laser 9a, at a separation location 10, that means a location along the moving direction of the thin glass ribbon 1 and at a time at which during the cooling of the thin glass ribbon 1 the viscosity of the glass is in a range from $10^7$ dPa·s to $10^{11}$ dPa·s, so that the edges 11, 12 of the thin glass ribbon newly formed by severing the borders 7, 8 are rounding off and in particular have a fire-polished surface.

According to the embodiment of FIG. 15, the thin glass ribbon 1 is withdrawn by rollers 13, 14 which only engage the already severed borders 7, 8. Therefore, tensile forces are applied to the thin glass ribbon 1 only in the region upstream the severing location 10, i.e. where the glass is still above the glass transformation temperature $T_g$ and therefore soft. This embodiment is preferred, since rollers 13, 14 do not act on the actual thin glass ribbon 1. Alternatively or cumulatively, rollers 15, 16 as shown in dashed lines may be used, by which the thin glass ribbon 1 is withdrawn in the central region of the ribbon.

Apparatus 2 preferably comprises setting means, not shown in the figures, for adjusting at least one of parameters drawing rate, mass flow rate, and/or severing location so that the severing of the borders 7, 8 while the thin glass ribbon 1 cools down is effected at a viscosity of the glass in a range from $10^7$ dPa·s to $10^{11}$ dPa·s, preferably in a range from $10^8$ dPa·s to $10^{11}$ dPa·s, more preferably in a range from $10^9$ dPa·s to $10^{10}$ dPa·s.

According to the invention the severing of the borders 7, 8 is preferably performed still in the hot-forming section, wherein the severing device 9 for separating the borders 7, 8 from the thin glass ribbon 1 is preferably arranged at a distance in a range from 80 mm to 400 mm, more preferably from 150 mm to 400 mm, most preferably in a range from 150 mm to 300 mm from the drawing orifice 4. This corresponds to glass temperatures of about 750° C. to 900° C. and respective associated glass viscosities in the range disclosed. Approximately 150 mm below the orifice 4 the thin glass ribbon moves almost like a solid body, so that when the borders 7, 8 are severed the useful region will not again be constricted by drawing forces.

To obtain a particularly homogeneous temperature profile of the thin glass ribbon 1 as a useful glass ribbon and to thereby avoid the creation of stresses and associated therewith a formation of warp, the borders 7, 8 are preferably severed with a width ranging from 30 mm to preferably at most 150 mm, particularly preferably from 10 to preferably at most 100 millimeters.

In the apparatus 2 shown in FIG. 15, the severing of the borders 7, 8 from the thin glass ribbon 1 is performed in a particularly advantageous embodiment of the method in the region of homogeneous temperature by means of a laser 9a, wherein the laser 9a or the laser beam 90 generated by the laser 9a melts the glass.

The heating of the cutting edge by laser 9a may (theoretically) lead to a capillarity-driven formation of secondary borders.

This can be approximated as follows:

It is assumed that the glass AF32® is heated in the focus of the laser to a temperature $T_0$: The time t of exposure to the laser is $$t = \frac{D_L}{v_{draw}} \quad (1)$$

wherein $D_L$ is the diameter of the laser focus and $v_{draw}$ is the drawing rate of the glass ribbon.

When the method is employed in an online process directly in conjunction with the shaping of the thin glass, the drawing rate depends on the speed of the glass ribbon during the creation thereof and on the glass thickness. In correlation with the glass volume, a thinner glass will be drawn more quickly than a thicker one. In the present example the drawing rate $v_{draw}$ for a thin glass of 100 μm thickness is 7.2 m/min (120 mm/s), and is 15 m/min (250 mm/s) for a thin glass having a thickness of 50 μm.

In the example where the laser focus has a diameter $D_L$ of 1 mm (0.001 m) and the drawing rate $v_{draw}$ is 7.2 m/min (120 mm/s), the resulting time of exposure to the laser is $$t = \frac{D_L}{v_{draw}} = \frac{0.001}{0.12}s = 0.008s. \quad (2)$$

During this time, the increase in temperature spreads within the glass ribbon 1 approximately according to the formula (*)

$$\frac{T(t,x) - T_\infty}{T_0 - T_\infty} = 1 - \mathrm{erf}\left(\frac{x}{2\sqrt{\frac{\lambda \cdot t}{\rho \cdot c_p}}}\right) \quad (3)$$

wherein t is the time of exposure to the laser;
x is the distance from the cutting line;
$T_0$ is the heating temperature of the glass in the focus of the laser;
$T_\infty$ is the glass temperature at the level of the laser focus;
$D_L$ is the diameter of the laser focus i;
ρ is the density of the glass (for AF32®=2430 kg/m³);
γ is the surface tension of the glass (for AF32®=0.3 N/m);
λ is the thermal conductivity of the glass (for AF32®=2 W/mK); and
$c_p$ is the specific heat capacity of the glass (for AF32®=1360 J/kgK).

Figure 16:
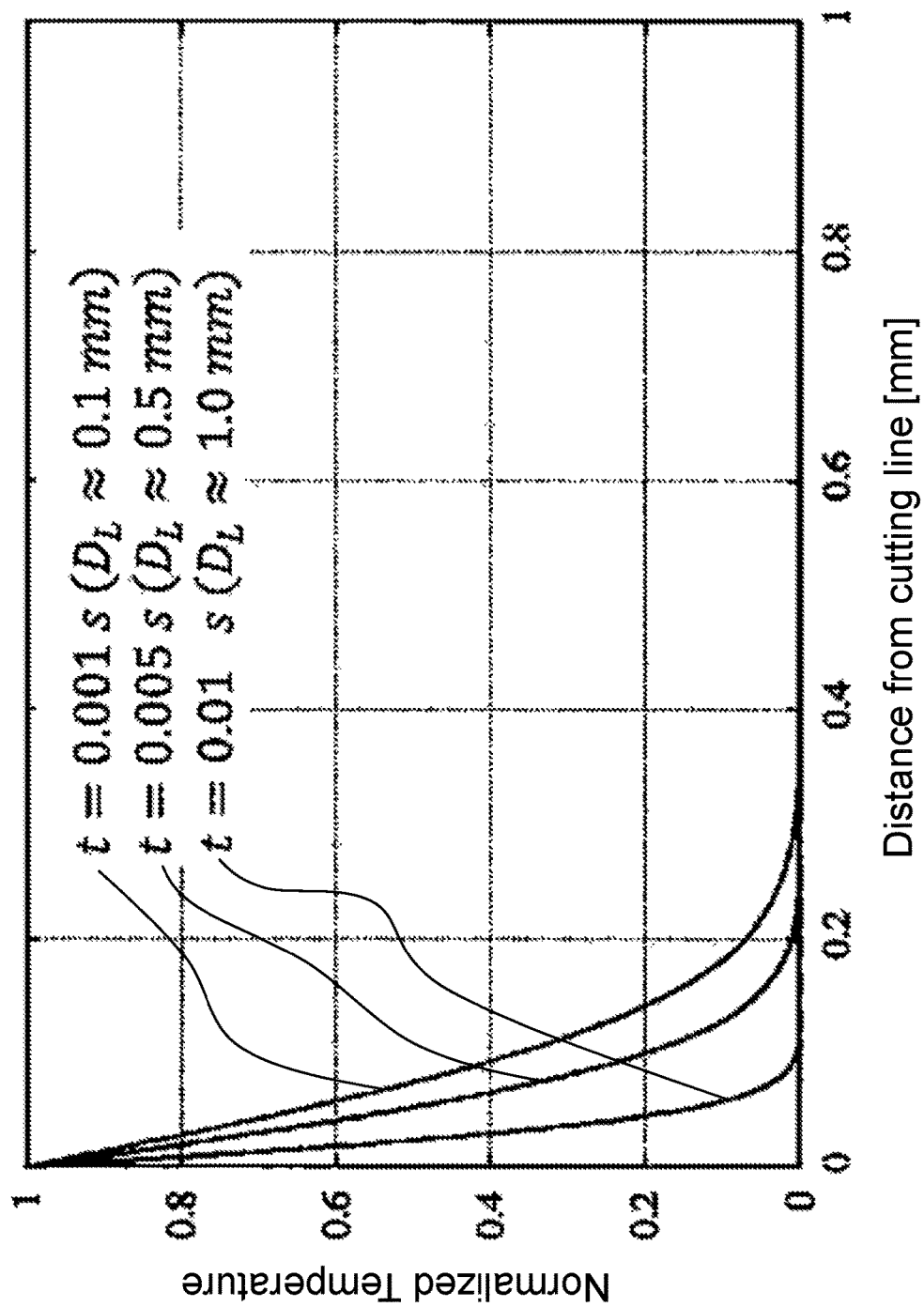
FIG. 16 shows a diagram of temperature profiles as a function of the distance from the cutting line.

FIG. 16 shows a diagram of the temperature profiles according to formula (3) as a function of the distance x from the cutting line. As can be seen therefrom, even with a very large laser focus ($D_L$≈1 mm) the temperature elevation spreads only by about 200 μm into the region of useful glass.

Due to the preferred short time of exposure to the laser 9a, a small portion of the useful glass is heated during severing. Due to capillary forces a secondary border may be caused thereby, with a maximum thickness $D_B$ at the edges of the thin glass ribbon for which applies:

$$D_B \leq 2 \cdot \sqrt{\frac{D_{use} \cdot 200\ \mu m}{\pi}} \quad (4)$$

wherein $D_{use}$ is the thickness of the thin glass ribbon in the center of the ribbon and π=3.1415 is the mathematical constant number π.

With a thickness of the useful glass $D_{use}$ in the example of 100 μm, the maximum thickness $D_B$ at the edges of the thin glass ribbon 1 is therefore $$D_B \leq 2 \cdot \sqrt{\frac{100\ \mu m \cdot 200\ \mu m}{\pi}} \approx 160\ \mu m, \quad (5)$$

and with a thickness of the useful glass $D_{use}$ in the example of 50 μm, the maximum thickness $D_B$ at the edges of the thin glass ribbon 1 is therefore $$D_B \leq 2 \cdot \sqrt{\frac{50\ \mu m \cdot 200\ \mu m}{\pi}} \approx 110\ \mu m. \quad (6)$$

For a thin glass ribbon 1 that is coiled into a roll with a winding core of 500 mm this means that the permanent stresses in borders 7, 8 are reduced from 50 MPa to 24 MPa and 16 MPa, respectively.

As an alternative to the apparatus 2 comprising a laser 9a as the severing device 9 according to FIG. 15, in which the glass is melted by the laser 9a, the severing of the borders 7, 8 of the thin glass ribbon 1 may be performed according to the apparatus 2 of FIG. 17 by squeezing using wheels 9b without breaking the glass which is still viscoelastic after the drawing.

For performing the method for producing a thin glass ribbon 1, a further preferred apparatus 2 according to FIG. 17 comprises a device for guiding the molten glass 3, preferably a drawing orifice 4, which is disposed inside heating means 5 and a heating muffle 6. The thin glass ribbon 1 is drawn from the molten glass 3, whereby borders 7, 8 are forming at both edges of the thin glass ribbon 1, which borders have a greater thickness than the center of the thin glass ribbon 1. After having been drawn from the molten glass 3, the thin glass ribbon 1 cools down, and the borders 7, 8 are severed from the thin glass ribbon 1 using a severing device 9, in particular using wheels 9b, at a separation location 10, that means at a location along the moving direction of the thin glass ribbon 1 and at a time at which during the cooling of the thin glass ribbon 1 the viscosity of the glass is in a range from $10^7$ dPa·s to $10^{11}$ dPa·s, so that the edges 11, 12 of the thin glass ribbon newly formed by severing borders 7, 8 are rounding off and in particular have a fire-polished surface.

According to the embodiment of FIG. 17, the thin glass ribbon 1 is withdrawn by rollers 13, 14 which only engage the already severed borders 7, 8. Therefore, tensile forces are applied to the thin glass ribbon 1 only in the region upstream the severing location 10, that means where the glass is still above the glass transformation temperature $T_g$ and therefore soft. This embodiment is preferred, since rollers 13, 14 do not act on the actual thin glass ribbon 1. Alternatively or cumulatively, rollers 15, 16 may be used (as in FIG. 15), which are not shown in FIG. 17, by means of which the thin glass ribbon 1 is withdrawn in the central region of the ribbon.

Figure 18:
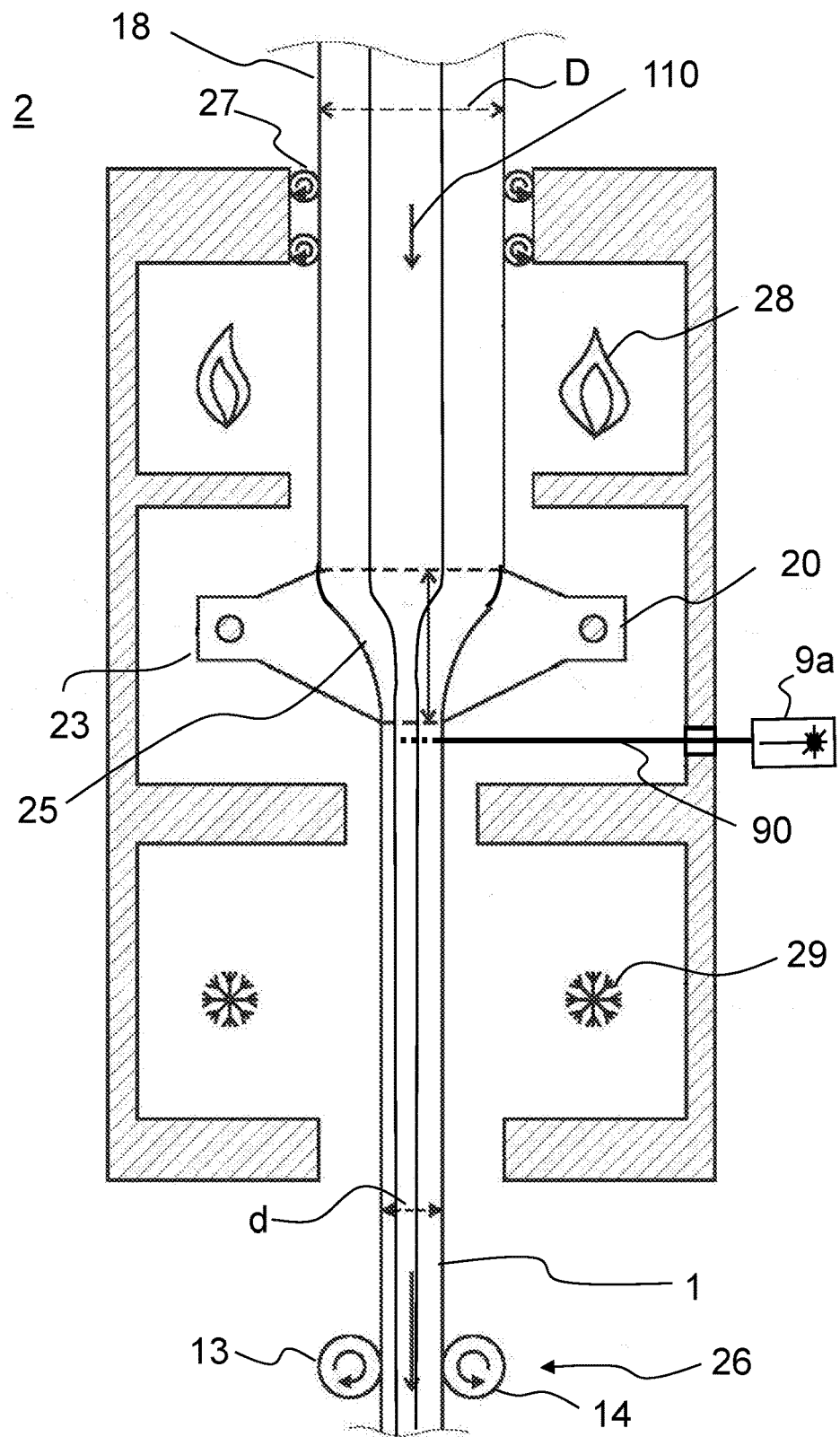
FIG. 18 shows an apparatus according to the invention for producing a thin glass ribbon by drawing from a preform.

In the exemplary embodiments of the invention described above the glass ribbon was drawn from a molten glass 3, in which case the dimensions of the glass ribbon are essentially determined by the shape of an orifice 4. As mentioned above, the invention may also be applied in similar manner to the drawing of glass ribbons from preforms. In such method typically a plate-shaped preform is provided, and a longitudinal section of the preform is heated by heating means to such an extent that the glass of the preform softens. By applying a tensile force the softened glass can then be drawn into a glass ribbon. FIG. 18 shows an example of such an apparatus 2 for producing the thin glass ribbon 1. Here, the plate-shaped glass preform 18 is shown in a side view, looking to an edge face or to the border of the thin glass ribbon 1 which is forming during drawing.

In apparatus 2 the glass preform 18 is moved from above downwards, for example. Apparatus 2 comprises heating means 20 arranged in a central section of apparatus 2. In this embodiment, heating means 20 comprise shields 23 for thermally shielding a deformation zone 25 that is forming. A portion of the glass preform 18 which is located in the deformation zone 25 is heated to such an extent that it reaches a temperature T2 at which the viscosity of the glass is below $10^8$ dPa·s, preferably at most $10^{7.6}$ dPa·s. Glass preform 18 is drawn in the drawing direction 110, for example downwards, by drawing means 26 which are implemented in form of two driven rollers 13, 14 here. Since the feeding means 27 which are likewise implemented in form of rollers here are advancing the glass preform 18 more slowly than the drawing means 26 are drawing, the glass preform 18 is deformed in deformation zone 25. Therefore the glass preform 18 becomes thinner, the thickness d of the so formed glass ribbon 1 after deformation is smaller than the thickness D before the deformation.

Generally, without limitation to the specific example of an apparatus 2 shown in FIG. 18, the glass preform 18 is preferably pre-heated prior to the heating in the deformation zone 25. For this purpose, apparatus 2 preferably comprises a preheating zone 28 in which the preform 18 can be heated to a temperature T1. Pre-heating zone 28 is preferably arranged in a section upstream of the deformation zone 25 as seen in the drawing direction 110, for example in an upper section of apparatus 2. Temperature T1 preferably corresponds to a viscosity η1 from $10^{10}$ to $10^{14}$ dPa·s. Thus, the glass preform 18 is preferably pre-heated before entering the deformation zone 25. Therefore, it may be advanced faster through the deformation zone 25, because the time required to reach the temperature T2 for softening the glass is shorter. Moreover, preheating zone 28 prevents glasses having a high coefficient of thermal expansion from breaking due to excessive temperature gradients. Generally, without limitation to the exemplary embodiment, temperature T2 is chosen so that the glass softens to such an extent that the viscosity of the glass has a value of not more than $10^8$ dPa·s, preferably at most $10^{7.6}$ dPa·s.

After passing through the deformation zone 25, the so obtained thin glass ribbon 1 is fed to an annealing device 29 which is symbolized by an ice crystal in the figure. Preferably, the glass is slowly cooled down in controlled manner to relief stresses. Actually, the cooling device 29 may therefore be implemented in form of an annealing furnace or lehr, with the glass passing through the viscosity range between the annealing point and the strain point in the annealing furnace.

Like in the exemplary embodiment shown in FIG. 15, a laser 9a is provided as a severing device, with a laser beam 90 that melts the glass of the thin glass ribbon 1 which is still viscoelastic after the drawing, so that the thin glass ribbon melts through at the point of impingement of the laser beam 90. The laser beam 90 may for example be introduced through an opening in the wall of apparatus 2, as shown, so that the laser beam 90 impinges on the thin glass ribbon 1 below the deformation zone 25. Here, the point of impingement is chosen so that the viscosity of the glass at this point is still in a range from $10^7$ dPa·s to $10^{11}$ dPa·s.

It will be apparent to those skilled in the art that the invention is not limited to the embodiments described above, but rather may be modified in various ways within the scope of the appending claims. In particular, the features of individual exemplary embodiments may be combined. For example, instead of laser 9a the apparatus 2 shown in FIG. 18 may be equipped with a cutting wheel or wheels 9b as shown in the embodiment of FIG. 17, for severing the borders.

LIST OF REFERENCE NUMERALS

1 Thin glass ribbon
2 Apparatus for performing the method for producing the thin glass ribbon 1
3 Molten glass
4 Drawing orifice
5 Heating means
6 Heating muffle
7, 8 Borders
9 Severing device
9a Laser as the severing device
9b Wheels as the severing device
10 Severing location
11, 12 Edges
13, 14 Rollers
15, 16 Rollers
18 Preform
20 Heating means for heating 18
25 Deformation zone
26 Drawing means
27 Feeding means
28 Preheating zone
29 Annealing device
90 Laser beam
110 Drawing direction

What is claimed is:

1. A method for producing a thin glass ribbon, comprising:
    drawing in a moving direction the thin glass ribbon from a molten glass or from a preform in a thickness of not more than 300 μm, the thin glass ribbon having borders at two edges, the borders having a thickness that is greater than a thickness at a center of the thin glass ribbon;
    cooling the thin glass ribbon down after drawing; and
    severing, during the cooling, the borders from the thin glass ribbon to define new borders of the thin glass ribbon, the severing being effected at a location along the moving direction and at a time at which glass of the thin glass ribbon has a viscosity in a range from $10^7$ dPa·s to $10^{11}$ dPa·s, wherein the new borders are round, and wherein the location is a distance in a range from 80 mm to 400 mm from a drawing orifice or a preform heater, wherein the step of severing provides the new borders with a fire-polished surface.

2. The method as claimed in claim 1, wherein the range is from $10^8$ dPa·s to $10^{11}$ dPa·s.

3. The method as claimed in claim 1, wherein the range is from $10^9$ dPa·s to $10^{10}$ dPa·s.

4. The method as claimed in claim 1, wherein the step of severing comprises using a laser to sever the borders from the thin glass ribbon, wherein the laser melts through the thin glass ribbon.

5. The method as claimed in claim 1, wherein the step of severing comprises squeezing the thin glass ribbon using wheels without breaking the glass which is still viscoelastic after the drawing.

6. The method as claimed in claim 1, wherein the severing of the borders is effected with a width in a range from 30 mm to 150 mm.

7. The method as claimed in claim 1, wherein, after the severing step, the thin glass ribbon has a temperature difference between the new borders and a center of the ribbon of less than 20° C., measured perpendicular to the drawing direction.

8. The method as claimed in claim 1, wherein the new borders are free of any microcracks.

9. The method as claimed in claim 1, wherein the new borders have a maximum thickness ($D_B$), wherein $$D_B \leq 2 \cdot \sqrt{\frac{D_{use} \cdot 200 \; \mu m}{\pi}},$$

wherein $D_{use}$ is the thickness at the center, and
wherein $\pi$ is the mathematical constant number $\pi$.

10. The method as claimed in claim 1, wherein the thin glass ribbon comprises a lithium aluminosilicate glass having the following composition, in wt %:

| | |
|---|---|
| $SiO_2$ | 55-69, |
| $Al_2O_3$ | 18-25, |
| $Li_2O$ | 3-5, |
| $Na_2O + K_2O$ | 0-30, |
| $MgO + CaO + SrO + BaO$ | 0-5, |
| $ZnO$ | 0-4, |
| $TiO_2$ | 0-5, |
| $ZrO_2$ | 0-5, |
| $TiO_2 + ZrO_2 + SnO_2$ | 2-6, |
| $P_2O_5$ | 0-8, |
| F | 0-1, and |
| $B_2O_3$ | 0-2. |

11. The method as claimed in claim 1, wherein the thin glass ribbon comprises a soda-lime glass having the following composition, in wt %:

| | |
|---|---|
| $SiO_2$ | 40-81, |
| $Al_2O_3$ | 0-6, |
| $B_2O_3$ | 0-5, |
| $Li_2O + Na_2O + K_2O$ | 5-30, |
| $MgO + CaO + SrO + BaO + ZnO$ | 5-30, |
| $TiO_2 + ZrO_2$ | 0-7, and |
| $P_2O_5$ | 0-2. |

12. The method as claimed in claim 1, wherein the thin glass ribbon comprises a borosilicate glass having the following composition, in wt %:

| | |
|---|---|
| $SiO_2$ | 60-85, |
| $Al_2O_3$ | 0-10, |
| $B_2O_3$ | 5-20, |
| $Li_2O + Na_2O + K_2O$ | 2-16, |
| $MgO + CaO + SrO + BaO + ZnO$ | 0-15, |
| $TiO_2 + ZrO_2$ | 0-5, and |
| $P_2O_5$ | 0-2. |

13. The method as claimed in claim 1, wherein the thin glass ribbon comprises an alkali metal aluminosilicate glass having the following composition, in wt %:

| | |
|---|---|
| $SiO_2$ | 40-75, |
| $Al_2O_3$ | 10-30, |
| $B_2O_3$ | 0-20, |
| $Li_2O + Na_2O + K_2O$ | 4-30, |
| $MgO + CaO + SrO + BaO + ZnO$ | 0-15, |
| $TiO_2 + ZrO_2$ | 0-15, and |
| $P_2O_5$ | 0-10. |

14. The method as claimed in claim 1, wherein the thin glass ribbon comprises an alkali metal aluminosilicate glass having the following composition, in wt %:

| | |
|---|---|
| $SiO_2$ | 50-75, |
| $Al_2O_3$ | 7-25, |
| $B_2O_3$ | 0-20, |
| $Li_2O + Na_2O + K_2O$ | 0-4, |
| $MgO + CaO + SrO + BaO + ZnO$ | 5-25, |
| $TiO_2 + ZrO_2$ | 0-10, and |
| $P_2O_5$ | 0-5. |

15. The method as claimed in claim 1, wherein the thickness is at least 5 μm.

16. A method for producing a thin glass ribbon, comprising:
drawing in a moving direction the thin glass ribbon from a molten glass or from a preform in a thickness of not more than 300 μm, the thin glass ribbon having borders at two edges, the borders having a thickness that is greater than a thickness at a center of the thin glass ribbon;
cooling the thin glass ribbon down after drawing; and
severing, during the cooling, the borders from the thin glass ribbon to define new borders of the thin glass ribbon, the severing being effected at a location along the moving direction and at a time at which glass of the thin glass ribbon has a viscosity in a range from $10^7$ dPa·s to $10^{11}$ dPa·s, wherein the new borders are round, wherein the step of severing provides the new borders with a fire-polished surface,
wherein the new borders have a maximum thickness ($D_B$), wherein $$D_B \leq 2 \cdot \sqrt{\frac{D_{use} \cdot 200 \; \mu m}{\pi}},$$

wherein $D_{use}$ is the thickness at the center, and
wherein $\pi$ is the mathematical constant number $\pi$.

* * * * *